US012638133B2

(12) United States Patent
Esarey et al.

(10) Patent No.: US 12,638,133 B2
(45) Date of Patent: May 26, 2026

(54) REFUELING ASSEMBLIES FOR FUEL TANKS, REFILLABLE FUEL TANKS, AND ASSOCIATED METHODS

(71) Applicant: Ignik Outdoors, Inc., Bainbridge Island, WA (US)

(72) Inventors: Graeme Esarey, Bainbridge Island, WA (US); Peter Pontano, Seattle, WA (US); ShaoJun Zhang, ShenZhen (CN); Victor Lin Fong Chi, Taipei City (TW)

(73) Assignee: Ignik Outdoors, Inc., Bainbridge Island, WA (US)

( * ) Notice: Subject to any disclaimer, the term of this patent is extended or adjusted under 35 U.S.C. 154(b) by 0 days.

(21) Appl. No.: 19/213,748

(22) Filed: May 20, 2025

(65) Prior Publication Data

US 2026/0063245 A1 Mar. 5, 2026

Related U.S. Application Data

(60) Provisional application No. 63/689,472, filed on Aug. 30, 2024.

(51) Int. Cl.
*F17C 5/00* (2006.01)

(52) U.S. Cl.
CPC ...... *F17C 5/005* (2013.01); *F17C 2201/0109* (2013.01); *F17C 2205/013* (2013.01); *F17C 2205/0165* (2013.01); *F17C 2205/0323* (2013.01); *F17C 2205/037* (2013.01); *F17C 2205/0394* (2013.01);
(Continued)

(58) Field of Classification Search
CPC .............. F17C 5/005; F17C 2201/0109; F17C 2205/013; F17C 2205/0165; F17C 2205/0323; F17C 2205/037; F17C 2205/0394; F17C 2221/035; F17C 2265/06; F17C 2270/0709
USPC .......................................................... 141/383
See application file for complete search history.

(56) References Cited

U.S. PATENT DOCUMENTS 4,153,083 A * 5/1979 Imler ...................... F17C 5/005 141/237
4,807,848 A * 2/1989 Macomber .............. F17C 13/00 251/149.4

(Continued)

*Primary Examiner* — Christopher M Afful
(74) *Attorney, Agent, or Firm* — Kolitch Romano Dascenzo Gates LLP

(57) ABSTRACT

Refueling assemblies comprise a chassis, at least one fuel conduit, a plurality of docking-port valve assemblies, and a fuel-source valve assembly. Refueling assemblies may be configured to simultaneously refill a plurality of fuel tanks. Fuel tanks comprise a fuel-receiving tank chamber and may include a fuel-tank male threaded member configured to be operatively coupled to a fuel-receiving device to deliver fuel from the tank to the fuel-receiving device. The fuel tanks may include a coupling member configured to be operatively coupled to a docking-port valve assembly of the refueling assembly but not to the fuel-receiving device. Methods of refilling a plurality of fuel tanks comprise operatively coupling each fuel tank to a refueling assembly, operatively coupling a fuel-source valve assembly of the refueling assembly to a fuel source, and opening a main valve of the fuel-source valve assembly to permit fuel to flow simultaneously to the plurality of fuel tanks.

23 Claims, 14 Drawing Sheets

(52) U.S. Cl.
CPC .... *F17C 2221/035* (2013.01); *F17C 2265/06* (2013.01); *F17C 2270/0709* (2013.01)

(56) References Cited

U.S. PATENT DOCUMENTS

| | | | | |
|---|---|---|---|---|
| 5,404,921 | A * | 4/1995 | Lamoreaux | F17C 5/005 141/237 |
| 6,196,255 | B1 * | 3/2001 | Poillucci | F24C 3/062 137/259 |
| 6,895,952 | B1 * | 5/2005 | Bachelder | A47J 37/0786 251/149.6 |
| 7,806,138 | B1 * | 10/2010 | Frantz | F17C 13/04 137/263 |
| 2013/0153084 | A1 * | 6/2013 | Camilotti | B65B 31/025 141/83 |
| 2014/0261707 | A1 * | 9/2014 | Sakaguchi | F17C 1/00 137/1 |
| 2014/0290797 | A1 * | 10/2014 | Kriese | F17C 1/00 141/237 |
| 2015/0308620 | A1 * | 10/2015 | Frenal | F17C 13/084 137/255 |
| 2015/0377417 | A1 * | 12/2015 | Rado | F17C 13/04 141/369 |
| 2020/0208782 | A1 * | 7/2020 | Daniels | F16K 31/265 |

* cited by examiner

REFUELING ASSEMBLIES FOR FUEL TANKS, REFILLABLE FUEL TANKS, AND ASSOCIATED METHODS

RELATED APPLICATION

This application claims priority to U.S. Provisional Patent Application No. 63/689,472, which was filed on Aug. 30, 2024, and the complete disclosure of which is incorporated herein by reference.

FIELD OF THE DISCLOSURE

This disclosure relates to refueling assemblies configured to refill one or more fuel tanks, to refillable fuel tanks for use with the refueling assemblies, and to methods of using the same.

BACKGROUND OF THE DISCLOSURE

Conventional stationary gas-powered appliances, such as stationary gas grills, installed gas-powered heaters, recreational vehicles (RVs), and commercial gas grills, often are connected to natural gas supply lines or propane tanks that typically are sized to hold 20-40 pounds (lb.) of propane. For reference, a gallon of propane weighs approximately 4.2 lbs., which means a 20-pound conventional propane tank holds approximately 4.7 gallons of propane. Outdoor enthusiasts, campers, and others who utilize portable gas-powered appliances often utilize smaller fuel canisters to power, or fuel, these appliances. Conventional portable fuel canisters often are filled with 8-20 ounces (oz.) of a gaseous fuel, such as propane, butane, or combinations thereof. Because they are relatively small and light as compared to conventional larger propane tanks, they are more convenient to transport, as well as being less expensive. Most of such conventional portable fuel canisters are not configured to be refilled. This results in a large amount of waste and a negative environmental impact, as well as potential disposal issues due to the potential for the discarded tanks to contain residual, or unused, fuel.

Additionally, some conventional fuel canisters, such as 1-lb. propane canisters, are able to be refilled but are not compatible with conventional propane refilling stations that are configured to refill larger conventional propane tanks, such as the 20-40-pound tanks referenced above. As a result, specialized equipment and training are required to individually refill such conventional smaller refillable fuel canisters. As a result, users may be required to refill many of the small fuel canisters individually, thereby requiring a greater amount of time and hassle in comparison to using larger fuel canisters. Additionally, because of their small size, users may require multiple of the small fuel canisters to meet their fuel requirements for a particular camping or outdoor trip, event, etc. Accordingly, there is a need for improved refillable fuel canisters, or fuel tanks, and for refueling assemblies that are configured to simultaneously refill a plurality of such refillable fuel tanks.

SUMMARY OF THE DISCLOSURE

Refueling assemblies according to the present disclosure comprise a chassis, at least one fuel conduit, a plurality of docking-port valve assemblies, and a fuel-source valve assembly. The chassis comprises a body that defines a plurality of docking ports that are configured to operatively and respectively receive a plurality of fuel tanks. The fuel conduit(s) are supported and/or defined by the body. The docking-port valve assemblies are supported by the body, are in fluid communication with the fuel conduit(s), and are configured to be operatively coupled to the fuel tanks when the tanks are operatively positioned in the docking ports. The fuel-source valve assembly is supported by the body, is in fluid communication with the fuel conduit(s), and is configured to be operatively coupled to a fuel source to selectively permit fuel from the fuel source to be operatively delivered to the fuel tanks when the fuel tanks are operatively coupled to the docking-port valve assemblies. The device may be configured to simultaneously deliver fuel to a plurality of the fuel tanks.

Fuel tanks according to the present disclosure comprise a fuel-tank chamber and may include a fuel-tank male threaded member. The fuel-tank chamber is configured to receive and store a fuel, and the fuel-tank male threaded member is configured to be operatively coupled to a fuel-receiving device to permit the fuel to pass from the fuel-tank chamber to the fuel-receiving device. The fuel tank may include a fuel tank connector that is configured to be operably coupled to a docking-port valve assembly. The fuel tank connector further may be configured not to be operatively coupled to the fuel-receiving device.

Methods of refilling a plurality of fuel tanks comprise coupling each fuel tank of a plurality of fuel tanks to a refueling assembly, coupling a fuel-source valve assembly of the refueling assembly to a fuel source, and opening a main valve of the fuel-source valve assembly. The methods may include simultaneously delivering fuel to two or more, and optionally all, of the plurality of fuel tanks that are coupled to the refueling assembly.

DETAILED DESCRIPTION

Figure 1:
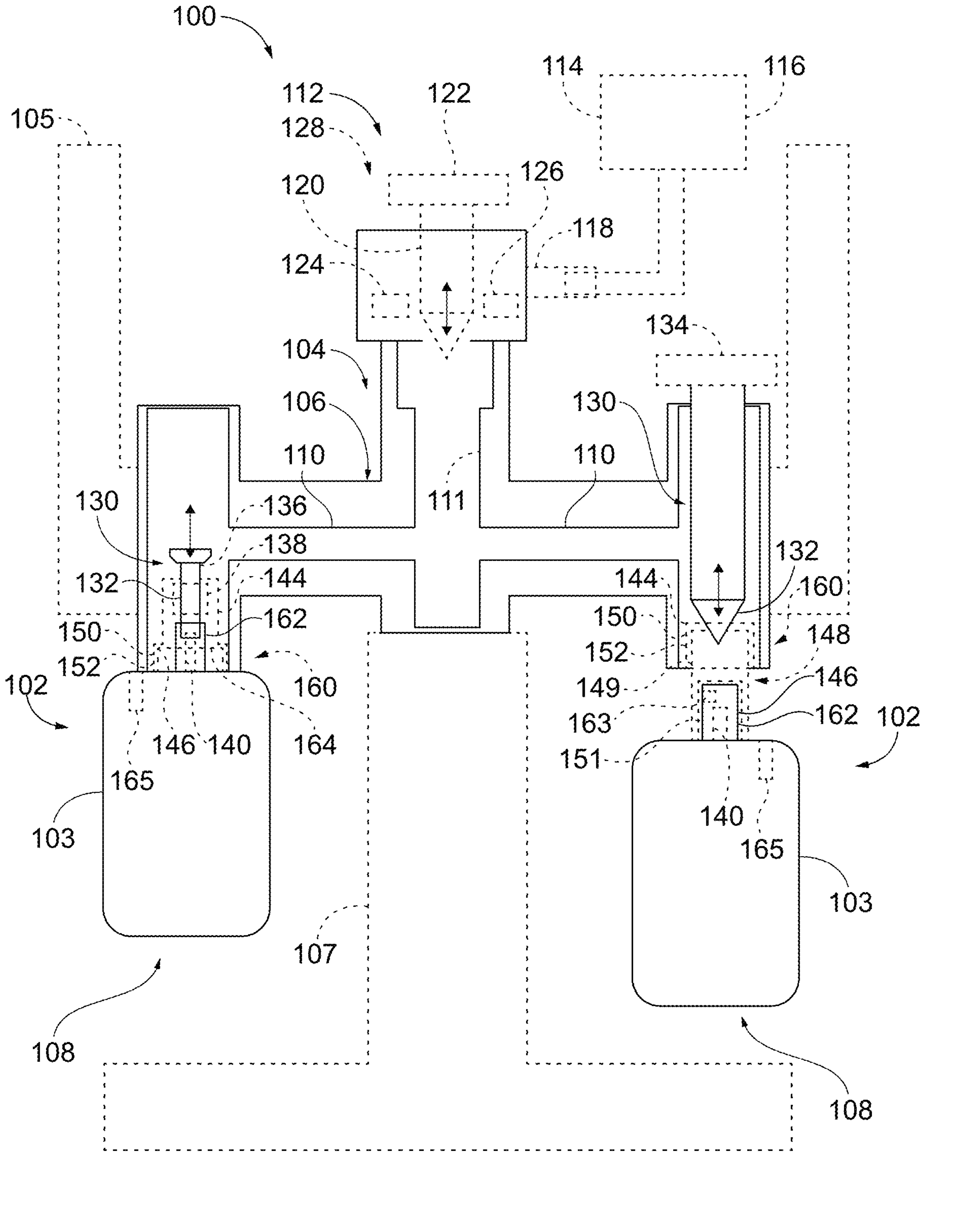
FIG. 1 is a diagram schematically representing refueling assemblies according to the present disclosure.
Figure 2:
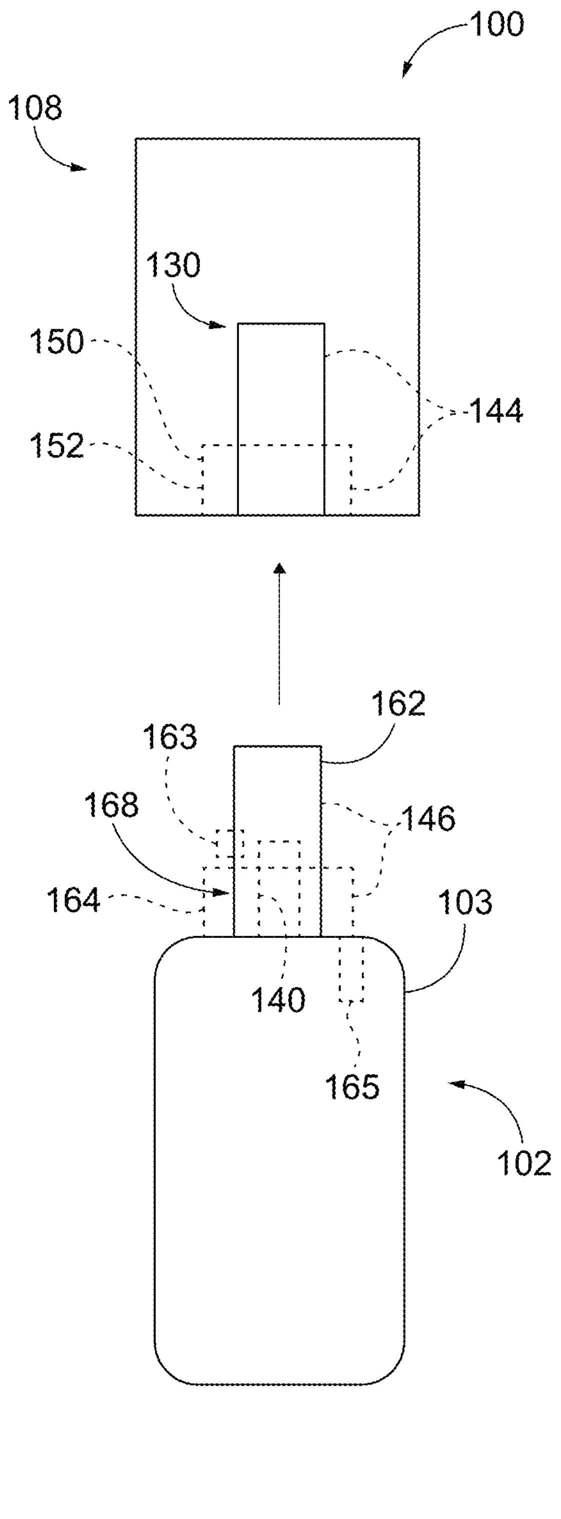
FIG. 2 is a diagram schematically representing threaded connection systems for connecting fuel tanks and docking-port valve assemblies according to the present disclosure.
Figure 3:
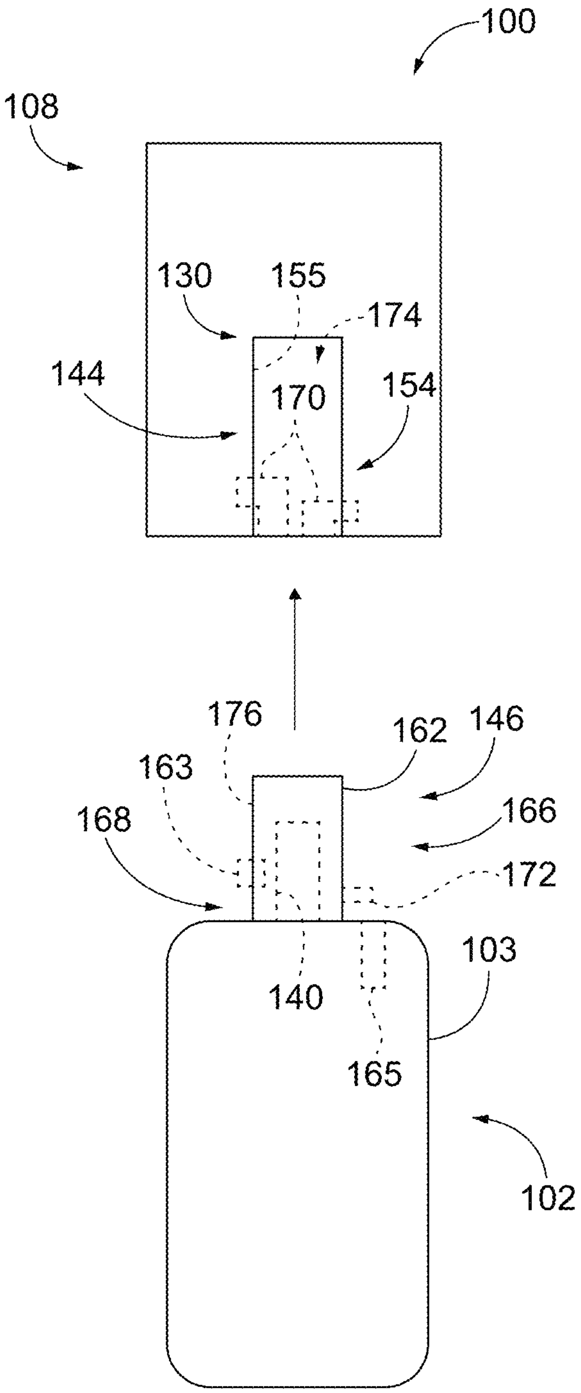
FIG. 3 is a diagram schematically representing bayonet-style connection systems for connecting fuel tanks and docking-port valve assemblies according to the present disclosure.
Figure 4:
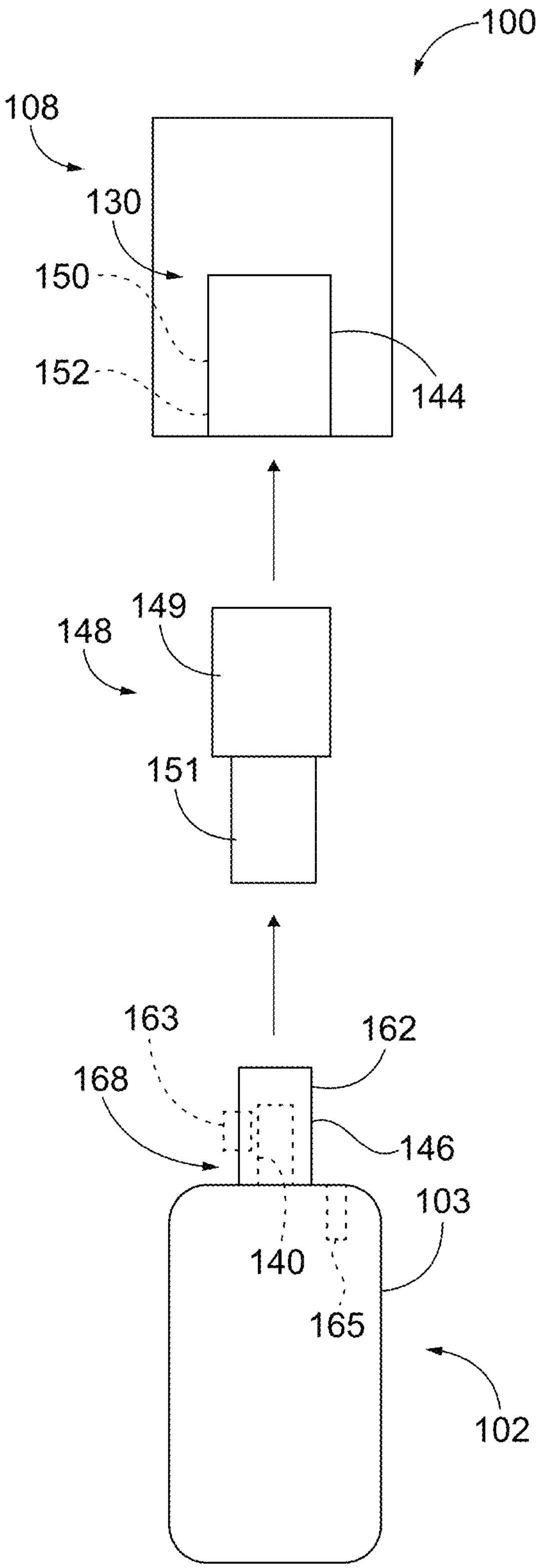
FIG. 4 is a diagram schematically representing adapter connection systems for connecting fuel tanks and docking-port valve assemblies according to the present disclosure.

FIGS. 1-14 provide examples of refueling assemblies for refueling one or more fuel tanks, examples of fuel tanks configured to be utilized with the refueling assemblies, and methods of refilling a plurality of fuel tanks. FIG. 1 schematically represents refueling assemblies 100 and fuel tanks 102 according to the present disclosure. FIGS. 2-4 schematically represent non-limiting examples of connection systems for connecting a fuel tank 102 to a refueling assembly 100. FIGS. 5-13 illustrate additional examples of refueling assemblies 100 and fuel tanks 102 according to the present disclosure. FIG. 14 schematically represents methods 200 according to aspects of the present disclosure.

Elements that serve a similar, or at least substantially similar, purpose are labeled with like numbers in each of FIGS. 1-13, and these elements may not be discussed in detail herein with reference to each of FIGS. 1-13. Similarly, all elements may not be labeled in each of FIGS. 1-13, but reference numerals associated therewith may be utilized herein for consistency. Elements, components, and/or features that are discussed herein with reference to one or more of FIGS. 1-14 may be included in and/or utilized with any of FIGS. 1-14 without departing from the scope of the present disclosure.

FIG. 1 schematically illustrates examples of refueling assemblies 100 and fuel tanks 102 according to the present disclosure. Fuel tanks 102 additionally or alternatively may be described as or referred to as fuel-receiving canisters, refillable fuel tanks, refillable fuel canisters, fuel-receiving tanks, gas fuel tanks, gas canisters, and/or gas cylinders. As discussed in more detail herein, in some examples, refueling assemblies 100 are configured to facilitate simultaneous refilling of a plurality of fuel tanks 102. In some examples, refueling assemblies 100 are configured to facilitate simultaneous refilling of a plurality of fuel tanks 102 using conventional fuel sources, such as conventional commercial propane tank refilling stations that conventionally are used to fill larger propane tanks that hold at least 5 pounds (lb.) and often at least 15 lb. of propane. Refueling assemblies 100 additionally or alternatively may be referred to as fueling assemblies 100, refilling assemblies 100, gas-tank filling assemblies 100, and/or gas-canister filling assemblies 100.

As schematically represented in FIG. 1, refueling assemblies 100 generally include at least a chassis 104 that includes a body 106, at least one fuel conduit 110 that is supported and/or defined by the body, a plurality of docking-port valve assemblies 130, and a fuel-source valve assembly 112. The chassis 104 additionally or alternatively may be described as or referred to as a frame, a stand, a housing, a base, and/or a supporting stand. One or both of plurality of docking-port valve assemblies 130 and the fuel-source valve assembly 112 may be described as being supported by the body 106 and/or the chassis 104, and/or as being coupled to the body 106 and/or the chassis 104.

As used herein, an element that is supported by another element may be carried, positioned, secured, reinforced, located, maintained, and/or reinforced by the other element. As used herein, elements that are coupled together are connected together, which may include being configured to be selectively and repeatedly coupled together and subsequently decoupled without damage or destruction of the elements. Accordingly, elements that are operatively coupled together are configured to be coupled together in a manner that enables the operation for which the elements are configured to be utilized. For example, when a docking-port valve is operatively coupled to a fuel tank, it is configured to selectively permit, or enable, flow of fuel to (and in some embodiments also from) the fuel tank via the docking-port valve assembly. Similarly, when the fuel-source valve assembly is operatively coupled to a fuel source, it is suitably connected to the fuel source and configured to enable the flow of fuel from the fuel source through the fuel-source valve assembly. The body 106 defines a plurality of docking ports 108 that are configured to operatively and respectively receive a plurality of fuel tanks 102. The docking ports 108 additionally or alternatively may be described as or referred to as docking-port compartments, docking-port volumes, fuel tank regions, and/or fuel tank volumes. Each docking port 108 generally defines a volume, or space, in which a fuel tank 102 may be operatively positioned for operative attachment to a respective docking-port valve assembly 130 of the plurality of docking-port valve assemblies 130. Docking ports 108 generally may be open to adjacent docking ports 108 and/or may be separated from or maintained in a spaced-apart relationship with one or more adjacent docking ports 108 by the chassis 104.

As mentioned, at least one fuel conduit 110 is supported by and/or defined by the body 106. The fuel conduit(s) fluidically connect the fuel-source valve assembly 112 to the plurality of docking-port valve assemblies 130. The docking-port valve assemblies 130 are supported by the body 106, are in fluid communication with the at least one fuel conduit 110, and are configured to be operatively coupled to the plurality of fuel tanks 102 when they are operatively positioned in the plurality of docking ports 108. Fuel conduits 110 additionally or alternatively may be described as or referred to as dispensing channels, fuel lines, and/or fuel dispensing channels.

As also mentioned, in some examples, the fuel conduit(s) are defined by the body 106 of the chassis 104, such as by extending at least partially, if not at least substantially, through the body. In other examples, fuel conduits 110 are distinct from the body and operatively extend to respective docking-port valve assemblies 130 for delivery of fuel thereto. For example, such fuel conduits may be coupled to the body, may extend external the body, may be supported on, by, or from the body, etc. In some examples, a plurality of fuel conduits may be described as or referred to as a conduit assembly, a fuel conduit assembly, a chassis fuel conduit assembly, and/or dispensing channels.

The fuel-source valve assembly 112 is supported by the body 106, is in fluid communication with the fuel conduit(s) 110, and is configured to be operatively coupled to a fuel source 114 to selectively permit fuel from the fuel source 114 to be operatively delivered to the plurality of fuel tanks 102 when they are operatively coupled to the plurality of docking-port valve assemblies 130. The fuel-source valve assembly 112 additionally or alternatively may be described as or referred to as a main valve.

In some examples, refueling assembly 100 is configured to facilitate simultaneous refueling of fuel tanks 102 that are operatively coupled to respective docking-port valve assemblies 130 of refueling assembly 100.

Fuel tanks 102 may be, or include, any suitable fuel storage devices that are configured to be operatively coupled to docking-port valve assemblies 130 within docking ports 108. Fuel tank 102 comprises a fuel-tank chamber 103 which is configured to receive and store a fuel, such as a gaseous fuel, which subsequently may be selectively dispensed from the fuel tank to power or fuel a fuel-receiving device, which additionally or alternatively may be referred to as a gas-powered appliance and/or a fuel-receiving appliance. Examples of suitable gaseous fuels include propane, butane, and mixtures thereof.

Fuel-tank chamber 103 may have any suitable fuel storage capacity, or volume, including capacities of conventional portable disposable (non-refillable) gas fuel canisters. As examples, fuel-tank chamber 103, and thus fuel tank 102, may be sized and/or otherwise configured to selectively receive and store at least 8 ounces (oz.), at least 12 oz., 16 oz. (i.e., one pound [lb.]), 14-18 oz., at least 18 oz., at least 20 oz., at least 24 oz., at least 30 oz., at most 40 oz., at most 34 oz., at most 28 oz., at most 24 oz., at most 20 oz., at most 17 oz., and most 14 oz., and/or at most 12 oz. of fuel.

Fuel tank 102 may comprise a fuel tank male threaded member 162 that is configured to operatively couple fuel tank 102 to any suitable fuel-receiving device, e.g., any suitable gas-powered grill, stove, lantern, heater, or other appliance, and to permit dispensing fuel from fuel-tank chamber 103 to the fuel-receiving device. In some examples, fuel-tank male threaded member 162 comprises a 1-20 unified extra fine (UNEF) threaded connector that is utilized on conventional 1-lb. propane tanks.

Fuel tank 102 may comprise a main cylinder valve 140 that is configured to selectively permit fuel to enter or exit fuel-tank chamber 103 of fuel tank 102. In some examples, main cylinder valve 140 comprises any suitable check valve that is configured to selectively permit fuel into and out of fuel-tank chamber 103. In some examples, main cylinder valve 140 is configured to be automatically opened and closed without requiring user actuation, e.g., in response to at least a threshold opening pressure applied on main cylinder valve 140 by the fuel entering or exiting fuel tank 102.

In some examples, fuel tank 102 comprises a fuel-tank bleeder valve 163 and/or a fuel-tank pressure relief valve 165. Fuel-tank bleeder valve 163 is configured to be selectively opened and closed by a user, e.g., by turning a bleeder-valve screw. When open, fuel-tank bleeder valve 163 is configured to automatically expel a portion of the fuel from fuel tank 102 in response to the amount of fuel in fuel-tank chamber 103 exceeding a maximum storage capacity. For example, in response to the amount of fuel in fuel-tank chamber 103 exceeding the capacity, or maximum volume, of the fuel-tank chamber, fuel-tank bleeder valve 163 may be configured to expel the excess fuel within fuel-tank chamber 103. Fuel-tank pressure relief valve 165 is configured to open automatically in response to a pressure within fuel-tank chamber 103 exceeding a maximum threshold pressure. Fuel-tank pressure relief valve 165 is configured to automatically open and close in response to the pressure exceeding the maximum threshold pressure without requiring user action.

Chassis 104 may comprise any suitable rigid structure(s) configured to support fuel tanks 102 that are operatively received in docking ports 108 and to permit fuel to be selectively delivered to the fuel-tank chambers 103 of the fuel tanks via fuel conduit(s) 110. Chassis 104 may be formed from any suitable material or combination of materials, such as aluminum, steel, or other metals, composites, and/or plastic. Chassis 104 may be configured to support fuel tanks 102 in any desired orientation relative to a ground, or horizontal, surface, such as an upright, or vertical, orientation. Chassis 104 may be configured to support fuel tanks 102 in an elevated configuration, namely, a configuration in which the fuel tanks are supported in a spaced-apart arrangement above whatever surface or structure is immediately below the fuel tanks when the fuel tanks are operatively coupled to the refueling assembly.

Chassis 104 is configured to be picked up and manually moved around by a user without requiring lifting equipment. In some examples, chassis 104 comprises a handle 105 that is configured to be held by a user when moving chassis 104. In some examples, chassis 104 comprises a stand 107 that is configured to maintain chassis 104 in an upright position when placed on the ground or another horizontal surface. Chassis 104, including stand 107 and handle 105, may have any suitable shape and/or size configured to connect to and support fuel tanks 102. For example, chassis 104 may be at least 10-inches tall, at least 12-inches tall, at least 15-inches tall, at least 18-inches tall, at most 20-inches tall, at most 18-inches tall, and/or at most 15-inches tall. Chassis 104 may have a diameter, or outermost dimension perpendicular to the level ground when positioned thereon, of at least 8-inches, at least 10-inches, at least 12-inches, at least 15-inches, at most 15-inches, at most 12-inches, and/or at most 10-inches. In some examples, chassis 104 is approximately 15-inches tall and approximately 10-inches in diameter. Dimensions outside of or within these illustrative examples may be utilized without departing from the scope of the present disclosure.

Chassis 104 may comprise any suitable number and arrangement of docking ports 108, each of which is configured to be operatively receive a respective fuel tank 102. For example, chassis 104 may comprise at least 2 docking ports, at least 3 docking ports, at least 4 docking ports, at least 6 docking ports, at least 8 docking ports, at least 10 docking ports, at least 12 docking ports, at most 24 docking ports, at most 20 docking ports, at most 16 docking ports, at most 12 docking ports, at most 8 docking ports, at most 6 docking ports, and/or at most 4 docking ports. Each of docking ports 108 is configured to operatively receive fuel tank 102 for operative coupling to a respective docking-port valve assembly 130, as described further below. As used herein, reference to elements being operatively coupled or operatively connected together means that the components are coupled or connected in a manner in which the elements were configured to be connected or coupled, such as to enable a desired function or operability. For example, operative coupling of a fuel tank to a docking-port valve assembly enables fuel to flow between these components.

The fuel conduit(s) 110 are fluidically interconnect fuel-source valve assembly 112 and the plurality of docking-port valve assemblies 130 and thereby provide flow paths for fuel to selectively flow between the fuel-source valve assembly and the plurality of fuel tanks when operatively coupled to the docking-port valve assemblies. The fuel conduit(s) extend between fuel-source valve assembly 112 and the plurality of docking ports 108 to fluidically couple fuel-source valve assembly 112 to each docking port 108. Fuel conduit(s) 110 may be disposed internally of or formed by chassis 104 and/or may be disposed externally of chassis 104.

As illustrated in FIG. 1, body 106 of chassis 104 optionally may include or define an internal reservoir 111 that is configured to receive and store a volume of fuel. For example, internal reservoir 111 may act as a buffer or internal storage reservoir that facilities refilling of the fuel tanks during use of the refueling assembly. When present, internal reservoir 111 may be configured to receive or store a volume of fuel, such as a volume of fuel that is greater than the capacity of an individual fuel conduit 110 extending to and operatively coupled to a respective docking-port valve assembly 130. or optionally of all of the fuel conduits extending to and operatively coupled to the plurality of docking-port valve assemblies 130. For example, internal reservoir 111 may have an internal cross-sectional dimension that is greater than the internal cross-sectional dimension of such individual fuel conduits 110. As another example, internal reservoir 111 may be configured to contain a volume of fuel that is at least 0.25, at least 0.5, at least 0.75, at least 1, at least 2, at least 3, at least 5, at least 10, at most 20, at most 15, at most 10, at most 5, and/or at most 2 times the volume of fuel that fuel conduits 110 collectively are configured to contain during operative use of refueling assembly 100.

Refueling assembly 100 comprises a fuel-source valve assembly 112 fluidically and operatively coupled to the fuel conduit(s) 110. Fuel-source valve assembly 112 may comprise any suitable components that are configured to fluidically couple fuel conduit(s) 110 to a fuel source 114 and to selectively permit fuel from fuel source 114 to enter (i.e., flow into) the fuel conduit(s) 110. Fuel source 114 may comprise any conventional fuel source that is utilized to provide fuel to refillable fuel tanks. In some examples, fuel source 114 comprises a conventional propane tank filling station commonly found at gas, or petrol, stations, hardware stores, supermarkets, and other refilling stations for conventional refillable propane tanks having capacities of at least 5 lb. propane or more. In some examples, fuel-source valve assembly 112 is further configured to facilitate dispensing fuel from refilling assembly 100 and the fuel tanks 102 operatively coupled thereto to a fuel-receiving device 116. Fuel-source valve assembly 112 may be operatively coupled to chassis 104 in any suitable manner configured to facilitate fuel-source valve assembly 112 permitting the fuel to enter and/or exit fuel conduit(s) 110. For example, fuel-source valve assembly 112 and chassis 104 may be coupled to each other by a threaded connection or a quick-connect fitting connection. As another example, fuel-source valve assembly 112 and chassis 104 may be integral with one another.

In some examples, fuel-source valve assembly 112 comprises a fuel-source connector 118, which is configured to be operatively coupled to a fuel source 114 to facilitate receiving fuel from fuel source 114 into fuel conduit(s) 110 and/or operatively coupled to a fuel-receiving device 116 to facilitate dispensing fuel from fuel conduit(s) 110 into fuel-receiving device 116. Fuel-source connector 118 may comprise any suitable connection mechanism that is configured to be operatively coupled to fuel source 114 and/or fuel-receiving device 116. In some examples, fuel-source connector 118 is a conventional QCC1 connector used with conventional propane tanks to facilitate fuel-source connector 118 connecting to conventional propane tank refilling mechanisms and fuel-receiving devices.

In some examples, fuel-source valve assembly 112 comprises a main valve 120 that is configured to selectively permit the fuel to pass through fuel-source valve assembly 112 into fuel conduit(s) 110 and/or to pass from fuel conduit (s) 110 through fuel-source valve assembly 112 into fuel-receiving device 116. Main valve 120 is configured to be selectively opened and closed by a user. When main valve 120 is open, main valve 120 is configured to permit fuel to pass between fuel conduit(s) 110 and fuel source 114 or fuel-receiving device 116 through fuel-source valve assembly 112. When main valve 120 is closed, main valve 120 is configured to prevent fuel from passing through fuel-source valve assembly 112 to or from fuel conduit(s) 110. In some examples, main valve 120 comprises any suitable filling valve utilized on conventional propane tanks. Fuel-source valve assembly 112 may comprise a main-valve actuator 122 that is configured to be actuated by a user to selectively open and close main valve 120. Main-valve actuator 122 may comprise a hand wheel, crank, knob, and/or any other suitable user-manipulable element that is configured to be actuated by a user to selectively open or close main valve 120.

In some examples, fuel-source valve assembly 112 comprises a bleeder valve 124 and/or a pressure relief valve 126. Pressure relief valve 126 is configured to automatically open in response to a pressure in fuel conduit(s) 110 and/or internal reservoir 111 exceeding a maximum threshold pressure. When pressure relief valve 126 is open, pressure relief valve 126 is configured to permit fuel to exit fuel conduit(s) 110 and optional internal reservoir 111 through pressure relief valve 126. Pressure relief valve 126 is configured to open automatically in response to the pressure exceeding the maximum threshold pressure, without requiring user action. Bleeder valve 124 may be configured to be selectively opened and closed by a user. When bleeder valve 124 is open, bleeder valve 124 is configured to automatically release at least a portion of the fuel within fuel conduit(s) 110 and optional internal reservoir 111 in response to the amount of fuel in fuel conduit(s) 110 and optional internal reservoir 111 exceeding a maximum storage amount. In this example, the at least a portion of fuel that is released by bleeder valve 124 may be approximately equal to the amount of fuel within fuel conduit(s) 110 and optional internal reservoir 111 that exceeds the maximum storage amount. In some examples, bleeder valve 124 is configured to be selectively opened and closed by a user by turning a screw and/or any other suitable actuator. Bleeder valve 124 and/or pressure relief valve 126 may comprise any suitable bleeder valve and/or pressure relief valve that conventionally is used on 5 lb. or larger propane tanks.

In some examples, fuel-source valve assembly 112 comprises an Overfill Protection Device (OPD) valve 128 that is utilized on conventional propane tanks of 5 lb. or greater to prevent overfilling of the tank. For example, fuel-source connector 118 may comprise a conventional QCC1 connector of conventional OPD valves that is configured to be connected to conventional fuel sources and fuel receivers for propane tanks. This facilitates fuel-source valve assembly 112 connecting to fuel sources 114 or fuel-receiving devices 116 that are configured to be utilized with conventional propane tanks that store 5 lb. of fuel or more. This facilitates refueling assembly 100 being configured to refill smaller tanks that store less than 5 lb. of fuel (e.g., fuel tanks 102 with the capacities discussed herein), which conventionally do not have OPD valves, using conventional fuel sources 114 that are compatible with the larger propane tanks having OPD valves.

As described above, fuel-source valve assembly 112 is configured to facilitate receiving fuel from a fuel source 114 into fuel conduit(s) 110, and fuel conduit(s) 110 are fluidically coupled to each of docking-port valve assemblies 130 such that fuel may flow through the fuel conduits to the docking-port valve assemblies. Docking-port valve assembly 130 is configured to be operatively coupled to a respective fuel tank 102 within docking port 108 and to selectively permit the fuel to pass from fuel conduit(s) 110 into fuel tank 102. For example, docking-port valve assembly 130 may comprise a docking-port valve 132, which is configured to be selectively opened and closed. When docking-port valve 132 is open, docking-port valve 132 is configured to permit the fuel to pass between fuel conduit 110 and fuel tank 102 through docking-port valve assembly 130. When docking-port valve 132 is closed, docking-port valve 132 is configured to prevent the fuel from passing between fuel conduit 110 and fuel tank 102.

Docking-port valve assembly 130 may comprise any suitable docking-port valve 132 configured to selectively permit the fuel to pass into fuel tank 102. In some examples, docking-port valve 132 requires manual actuation by a user to open or close docking-port valve 132. For example, docking-port valve assembly 130 may comprise a docking-port valve actuator 134 that is configured to be selectively actuated by a user to open or close docking-port valve 132. Docking-port valve actuator 134 may comprise a hand wheel, knob, handle, lever, and/or any other suitable user-manipulable device that permits a user to selectively open and close docking-port valve 132.

Alternatively, docking-port valve 132 may be configured to be automatically opened and closed in response to docking-port valve 132 operatively coupling to fuel tank 102 within docking port 108. For example, docking-port valve 132 may comprise a spring-biased valve member 136 that is biased to a closed position by a spring 138. When spring-biased valve member 136 is closed by the spring bias, spring-biased valve member 136 prevents the fuel from exiting docking-port compartment 108 through docking-port valve assembly 130. When spring-biased valve member 136 is connected to fuel tank 102, spring 138 is compressed and transitions spring-biased valve member 136 to an open position. When spring-biased valve member 136 is in the open position, spring-biased valve member 136 permits the fuel to pass through docking-port valve assembly 130 to fuel tank 102. Having spring-biased valve member 136 open automatically in response to connecting to fuel tank 102 facilitates spring-biased valve member 136 permitting fuel to be dispensed to fuel tank 102 only when a fuel tank 102 is operatively coupled to docking-port valve assembly 130.

In some examples, when spring-biased valve member 136 is coupled to fuel tank 102, spring-biased valve member 136 is configured to engage a main cylinder valve 140 of fuel tank 102. When engaged with each other, main cylinder valve 140 of fuel tank 102 and spring-biased valve member 136 are configured to be opened automatically as a result of mutual engagement between the two valves. When fuel tank 102 is disconnected from spring-biased valve member 136, main cylinder valve 140 and spring-biased valve member 136 are configured to transition automatically to closed positions. As a result, fuel is permitted to flow between fuel conduit 110 and fuel-tank chamber 103 of fuel tank 102 only when fuel tank 102 is operatively coupled to docking-port valve assembly 130. This prevents undesired discharge of fuel when fuel-receiving tank 102 is not connected to docking-port valve assembly 130.

Docking-port valve assembly 130 may be operatively coupled to fuel tank 102 within docking port 108 in any suitable manner to facilitate selectively permitting the fuel to pass to fuel tank 102 when docking-port valve 132 is open. For example, docking-port valve assembly 130 may comprise any suitable docking-port connector 144 that is configured to be coupled to fuel tank 102. In some examples, docking-port connector 144 is configured to be operatively coupled directly to a fuel tank connector 146 of fuel tank 102, e.g., via a threaded connection, bayonet-style connection, quick-connect connection, etc.

Alternatively, in some examples, refueling assembly 100 further comprises an adapter 148 that is configured to operatively couple docking-port valve assembly 130 to fuel tank 102. For example, adapter 148 may be configured to be operatively (and fluidically) coupled to both docking-port connector 144 of docking-port valve assembly 130 and to fuel tank connector 146 of fuel tank 102 and to permit fuel to pass between docking-port valve assembly 130 and fuel tank 102 through adapter 148. In some examples, adapter 148 comprises an adapter port connector 149 configured to operatively couple to docking-port connector 144 and an adapter tank connector 151 configured to operatively couple to fuel tank connector 146 of fuel tank 102.

Docking-port connector 144, fuel tank connector 146, and/or adapter 148 may comprise threaded connectors, bayonet-style connectors, quick-connect connectors, and/or any other suitable connection mechanisms configured to selectively and releasably connect to each other. As used herein, elements that are described as being releasably connected are configured to be selectively and repeatedly separated and reconnected without damage or destruction of one or more of the elements or any structures or substance used to secure the elements together. In the present example, docking-port connector 144, fuel tank connector 146, and/or adapter 148 are each configured to be selectively and repeatedly separated and reconnected without causing damage or destruction to docking-port connector 144, fuel tank connector 146, adapter 148, docking-port valve assembly 130, fuel tank 102, or any other elements of refueling assembly 100 or fuel tank 102.

Docking-port connector 144 may comprise any suitable connection mechanism(s) that are configured to mate with fuel tank connector 146 and/or adapter port connector 149. In some examples, docking-port connector 144 comprises a docking-port threaded member 150, e.g., a docking-port female threaded member 152, having an internal thread that is configured to mate with a male threaded member of fuel tank 102 or adapter 148. In other examples, docking-port connector 144 may comprise a docking-port bayonet connector 154, as described further below and shown in FIG. 3. In some examples, docking-port compartment 108 comprises a lower end region 160 and docking-port connector 144 is disposed at lower end region 160 of docking-port compartment 108. As used herein, "lower," "upper," and other relative positional terms are used with respect to the respective component, such as the refueling assembly 100, being in an upright orientation on a horizontal surface.

Fuel tank connector 146 may comprise any suitable connection mechanism(s) that is/are configured to mate with docking-port connector 144 and/or with adapter tank connector 151 to establish a fluid connection or pathway for fuel to flow between the connectors. In some examples, fuel tank connector 146 comprises a fuel-tank male threaded member 162 that is configured to be operatively coupled to any suitable fuel-receiving device. For example, fuel-tank male threaded member 162 may comprise a conventional 1-20 UNEF threaded connector utilized on conventional 1-lb. propane tanks to enable the conventional propane tanks to operatively couple to fuel-receiving devices. In some examples, docking-port connector 144 is configured to be operatively coupled directly to fuel-tank male threaded member 162. By this it is meant that an intermediate structure, coupling, adapter, etc. is not utilized to operatively couple the docking-port connector to the fuel-tank male threaded member.

In some examples, fuel tank connector 146 is distinct from fuel-tank male threaded member 162 of fuel tank 102 that is configured to operatively couple fuel tank 102 to a fuel-receiving device. In other words, fuel tank 102 may comprise fuel-tank male threaded member 162 to enable operative coupling of fuel tank 102 to a fuel-receiving device and a distinct, or separate, fuel tank connector 146 that is configured to operatively couple fuel tank 102 to docking-port valve assembly 130. In such examples, the fuel-tank male threaded member 162 may not be configured or otherwise capable of operatively coupling directly to docking-port valve assembly 130 and/or fuel tank connector 146 may not be configured and/or otherwise capable of operatively coupling directly to a fuel-receiving device. Expressed in different words, the fuel-tank male threaded member 162 and the docking-port valve assembly 130 may not be configured to be operatively coupled together, such as by omitting components that are configured to operatively and fluidically connect the fuel-tank male threaded member and the docking-port valve assembly. In some examples, fuel tank connector 146 comprises a fuel-tank male threaded collar 164 that extends around a base 168 of fuel-tank male threaded member 162. In such examples, docking-port connector 144 may comprise docking-port female threaded member 152 that is configured to operatively couple directly to fuel-tank male threaded collar 164, rather than coupling to fuel-tank male threaded member 162. In some examples, as described further below and shown in FIG. 3, fuel tank connector 146 comprises a fuel-tank bayonet connector 166 that is configured to be operatively coupled to docking-port bayonet connector 154.

As discussed, in some examples, refueling assembly 100 and/or fuel tank 102 comprises adapter 148 that is configured to fluidically couple docking-port valve assembly 130 to fuel tank 102. In such examples, docking-port connector 144 may not be compatible with or capable of operatively coupling directly to fuel tank connector 146. Adapter 148 is configured to permit fuel to pass between fuel conduit 110 and fuel tank 102 through adapter 148. In some examples, docking-port valve 132 of docking-port valve assembly 130 is configured to selectively engage adapter 148 to selectively permit the fuel to pass between fuel conduit 110 and fuel tank 102 through adapter 148.

Adapter 148 may comprise any suitable adapter port connector 149 that is configured to operatively couple to docking-port connector 144 and any suitable adapter tank connector 151 that is configured to operatively couple to fuel tank connector 146. For example, adapter tank connector 151 and/or adapter port connector 149 may comprise a threaded connector, a bayonet-style connector, a quick-connect connector, and/or any other suitable connection mechanism. In some examples, adapter tank connector 151 is configured to connect directly to fuel-tank male threaded member 162 of fuel tank 102. As such, adapter 148 may be configured to ensure compatibility between conventional 1-lb. propane tanks having a standard fuel-tank male threaded member 162 and refueling assembly 100. In some examples, adapter 148, when present, may be fixed to and/or integral with the fuel tank 102.

FIGS. 2-4 schematically illustrate non-limiting examples of suitable connectors and/or connection systems for connecting fuel tanks 102 to docking-port valve assemblies 130. FIG. 2 schematically illustrates an example threaded connection system between fuel tank 102 and docking-port valve assembly 130. FIG. 3 schematically illustrates an example bayonet-style connection system between fuel tank 102 and docking-port valve assembly 130. In the examples of FIGS. 2 and 3, fuel tank 102 and docking-port valve assembly 130 are configured to be directly coupled to each other without using adapter 148. FIG. 4 schematically illustrates an example adapter connection system that utilizes adapter 148 to operatively couple docking-port valve assembly 130 to fuel tank 102.

As shown in FIG. 2, in some examples, docking-port connector 144 of docking-port valve assembly 130 is configured to be operatively coupled directly to fuel-tank male threaded member 162 of fuel tank 102. As described above, fuel-tank male threaded member 162 is configured to couple fuel tank 102 to any suitable fuel-receiving device. Fuel-tank male threaded member 162 may comprise a conventional male threaded connector that is utilized on conventional 1-lb. propane tanks, e.g., a conventional 1-20 unified extra fine (UNEF) male threaded member with 20 threads per inch. In such examples, docking-port connector 144 comprises a docking-port female threaded member 152 that is compatible with fuel-tank male threaded member 162. The threaded connection between docking-port female threaded member 152 and fuel-tank male threaded member 162 permits a user to selectively and repeatedly connect and disconnect fuel tank 102 and docking-port valve assembly 130 without causing damage or destruction of any elements of refueling assembly 100 or fuel tank 102.

As shown in FIG. 2, in some examples, fuel tank connector 146 is distinct from fuel-tank male threaded member 162. For example, fuel tank connector 146 may comprise a fuel-tank male threaded collar 164 that extends around a base 168 of fuel-tank male threaded member 162. In such examples, docking-port female threaded member 152 is sized and shaped to mate with fuel-tank male threaded collar 164, rather than fuel-tank male threaded member 162. Fuel-tank male threaded collar 164 comprises an external thread that is configured to connect to an internal thread of docking-port female threaded member 152. Fuel-tank male threaded collar 164 may have any suitable size and/or shape. For example, fuel-tank male threaded collar 164 may have a diameter of at least 0.75 inches, at least 1 inch, at least 1.5 inches, at most 2 inches, at most 1.5 inches, and/or at most 1.25 inches.

Explained in other words, docking-port connector 144 may be configured to operatively couple to a fuel tank connector 146 of fuel tank 102 that is distinct, or different, from fuel-tank male threaded member 162. In such examples, docking-port connector 144 may not be compatible with or configured to connect to fuel-tank male threaded member 162. As shown in FIG. 2, docking-port connector 144 may comprise docking-port female threaded member 152 that is sized and shaped to mate with fuel-tank male threaded collar 164 that extends around base 168 of fuel-tank male threaded member 162.

As another example, and as shown in FIG. 3, docking-port connector 144 may comprise a docking-port bayonet connector 154, and fuel tank connector 146 may comprise a fuel-tank bayonet connector 166. Docking-port bayonet connector 154 may comprise any suitable structures that are configured to securely connect to fuel-tank bayonet connector 166. For example, docking-port bayonet connector 154 may comprise one or more walls 155 that collectively define a female receiving area 174, which is configured to receive a male bayonet member 176 of fuel-tank bayonet connector 166. One or more bayonet slots 170 are formed in or proximate female receiving area 174. For example, bayonet slots 170 may be formed in one or more walls 155 of docking-port bayonet connector 154 that define female receiving area 174. Each bayonet slot 170 is configured to receive an element of fuel-tank bayonet connector 166 to secure fuel tank 102 to docking-port valve assembly 130. In some examples, bayonet slots 170 are at least substantially L-shaped and have a first portion extending vertically relative to female receiving area 174 and a second portion that extends circumferentially around a portion of female receiving area 174.

Fuel-tank bayonet connector 166 comprises male bayonet member 176 that is configured to be received within female receiving area 174. In some examples, at least a portion of male bayonet member 176 comprises fuel-tank male threaded member 162. Fuel-tank bayonet connector 166 comprises one or more bayonet post(s) 172 that are configured to be received within a respective one of bayonet slots 170. Bayonet post(s) 172 may comprise any suitable structures protruding from male bayonet member 176 that are configured to be received within bayonet slot 170 of docking-port bayonet connector 154. In some examples, fuel-tank bleeder valve 163 is configured to be received within one of bayonet slots 170 when docking-port bayonet connector 154 connects with fuel-tank bayonet connector 166. For example, fuel-tank bleeder valve 163 may protrude from a first side of male bayonet member 176, and a bayonet post 172 may protrude from a second opposite side of male bayonet member 176. Docking-port bayonet connector 154 may comprise a first bayonet slot 170 disposed on a first side of female receiving area 174 that is configured to receive fuel-tank bleeder valve 163, and docking-port bayonet connector 154 further may comprise a second bayonet slot 170 disposed on the second side of female receiving area 174 that is configured to receive bayonet post 172.

As shown in FIG. 4, in some examples, an adapter 148 is utilized to operatively couple fuel tank 102 to docking-port valve assembly 130. In such examples, docking-port connector 144 may not be compatible with or configured to connect to fuel tank connector 146 of fuel tank 102. Adapter 148 comprises an adapter port connector 149 and an adapter tank connector 151. Adapter port connector 149 and adapter tank connector 151 may comprise any suitable connection mechanisms configured to be selectively and repeatedly coupled to each of docking-port connector 144 and fuel tank connector 146 without causing damage or destruction of any of the elements of refueling assembly 100 or fuel tank 102.

In some examples, adapter port connector 149 comprises a male threaded member that is configured to mate with docking-port female threaded member 152 via a threaded connection. In some examples, adapter port connector 149 may comprise a female threaded connector, and docking-port connector 144 comprises a male threaded connector. In some examples, adapter port connector 149 may comprise a bayonet-style connector that is configured to connect to docking-port bayonet connector 154. Adapter tank connector 151 may comprise a female threaded member that is configured to mate with fuel-tank male threaded member 162 of fuel tank 102.

Turning to FIGS. 5-13, additional examples of refueling assemblies 100 and fuel tanks 102 are illustrated. Where appropriate, the reference numerals from the schematic illustrations of FIGS. 1-4 are used to designate corresponding parts of the examples of FIGS. 5-13. However, the examples of FIGS. 5-13 are non-exclusive and do not limit refueling assemblies 100 or fuel tanks 102 to the illustrated embodiments of FIGS. 5-13. That is, refueling assemblies 100 and fuel tanks 102 are not limited to the specific embodiments of FIGS. 5-13, and refueling assemblies 100 may incorporate any number of the various aspects, configurations, characteristics, properties, variants, options etc. of refueling assemblies 100 or fuel tanks 102 that are illustrated in and discussed with reference to the schematic representations of FIGS. 1-4 and/or the embodiments of FIGS. 5-13, as well as variations thereof, without requiring the inclusion of all such aspects, configurations, characteristics, properties, etc. Furthermore, any additional aspects, configurations, characteristics, properties, variants, options, etc. disclosed in connection with refueling assemblies 100 or fuel tanks 102 of any of FIGS. 5-13 may be used and/or otherwise included with other refueling assemblies 100 or fuel tanks 102 according to the present disclosure, including refueling assemblies 100 or fuel tanks 102 according to FIGS. 1-4 or others of FIGS. 5-13. For the purpose of brevity, each previously discussed component, part, portion, aspect, region, etc. or variants thereof may not be discussed, illustrated, and/or labeled again with respect to the examples of FIGS. 5-13; however, it is within the scope of the present disclosure that the previously discussed features, variants, etc. may be utilized with the examples of FIGS. 5-13. In FIGS. 5-13, elements that were introduced or otherwise discussed in connection with FIGS. 1-4 may be indicated with a reference numeral that include a prime symbol (e.g., 100' instead of 100) to more specifically indicate the example illustrated in FIGS. 5-13. However, and as discussed, the other examples, features, variants, etc. discussed in connection with FIGS. 1-4 additionally or alternatively may be utilized, as appropriate or desired.

Figure 5:
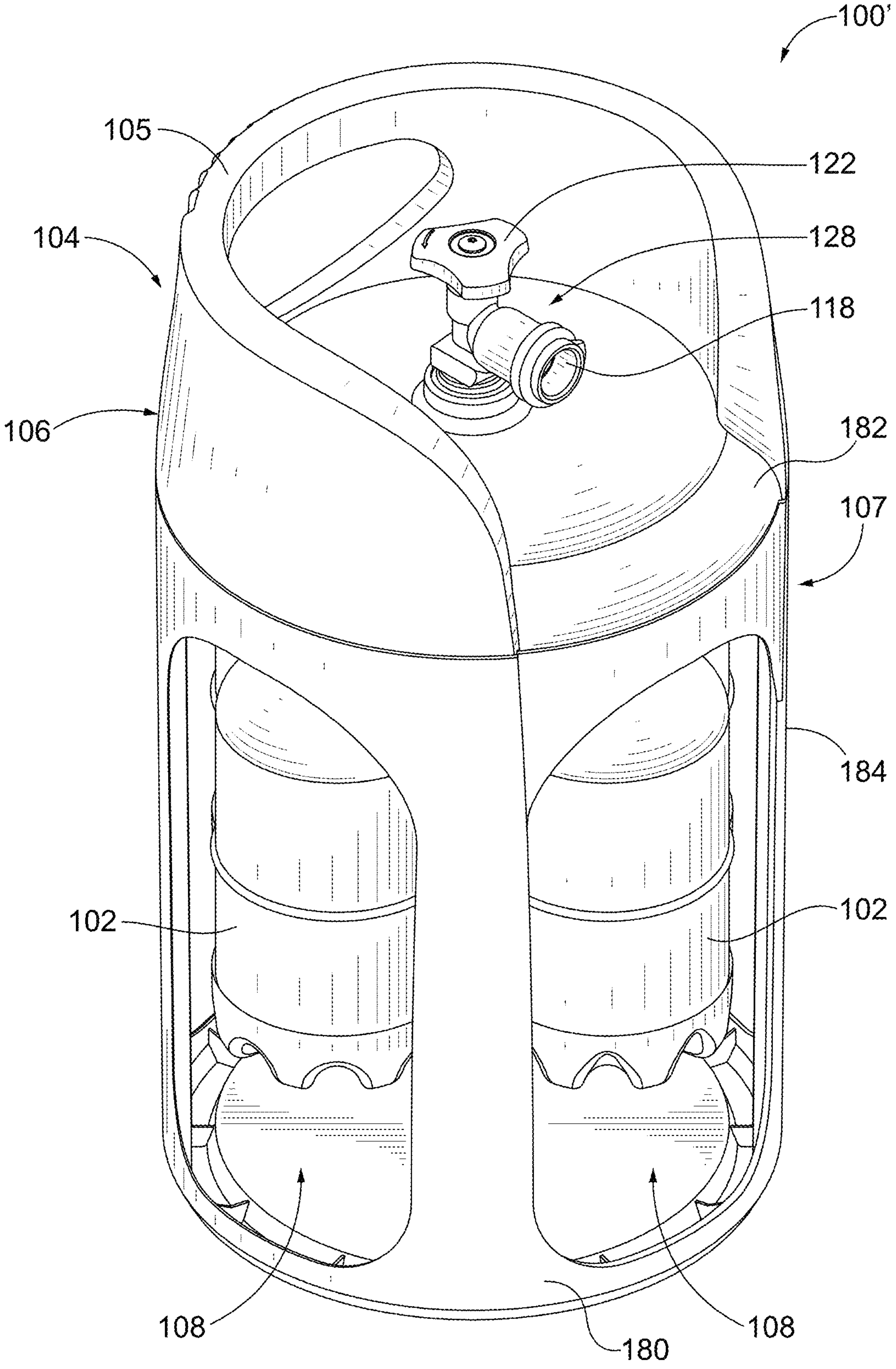
FIG. 5 is a top isometric view of an example refueling assembly according to the present disclosure.

FIGS. 5-10 illustrate a more specific example of a refueling assembly 100 according to the present disclosure, indicated at 100' in at least FIGS. 5-7 and 10. Refueling assembly 100' is configured to operatively receive four fuel tanks 102'. As seen in FIG. 5, the body 106 of the chassis 104 of refueling assembly 100' includes a supporting base 180, a supporting cover 182, and supporting pillars 184 extending between the supporting base and the supporting cover. More specifically, the body 106 includes four supporting pillars 184 positioned around the outer edge of the body and a single internal supporting pillar 184. It is within the scope of the disclosure that body 106 may include other sizes, numbers, and/or configurations of pillars 184.

Figure 6:
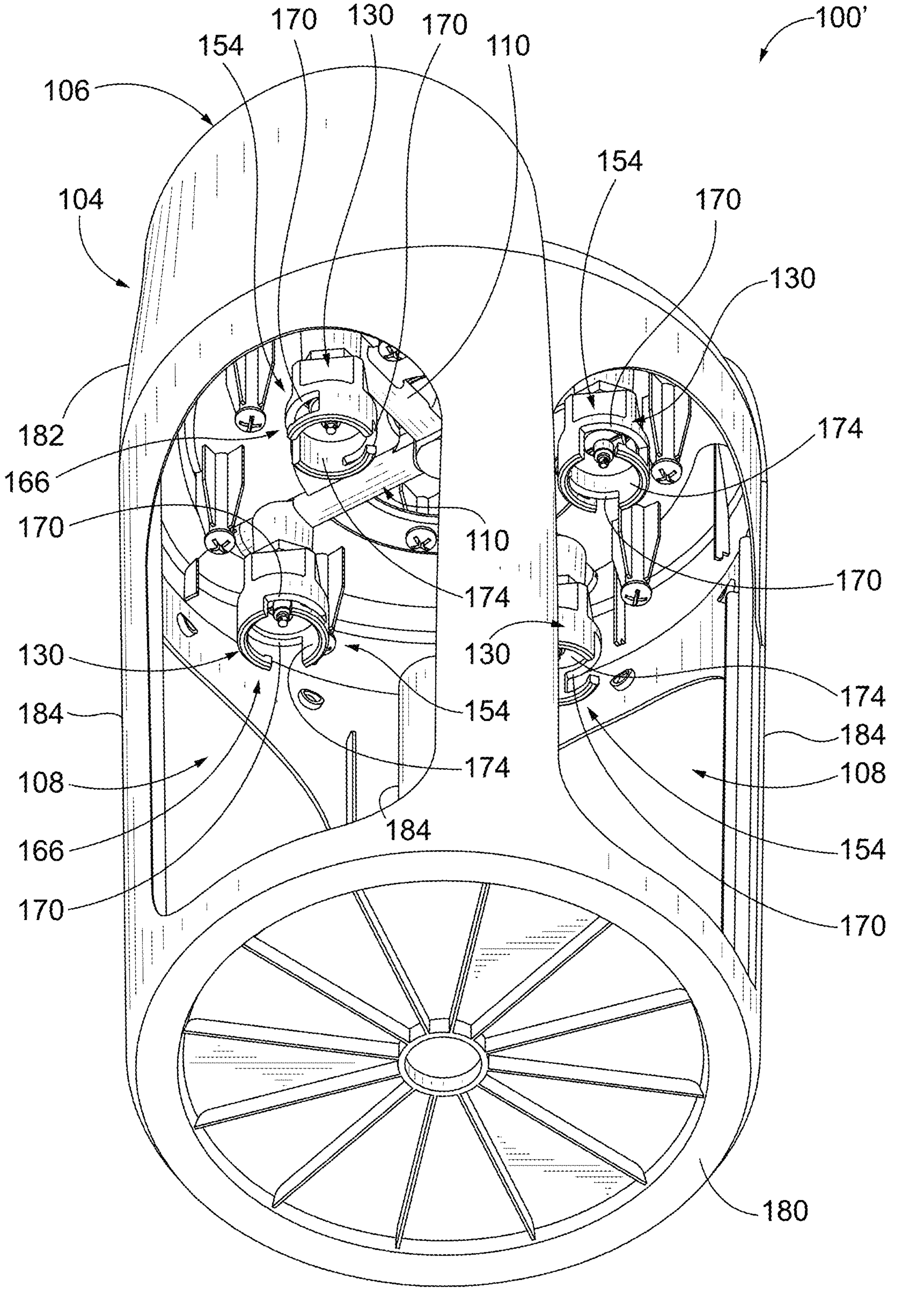
FIG. 6 is a bottom isometric view of the refueling assembly of FIG. 5, without the refillable fuel tanks present.
Figure 7:
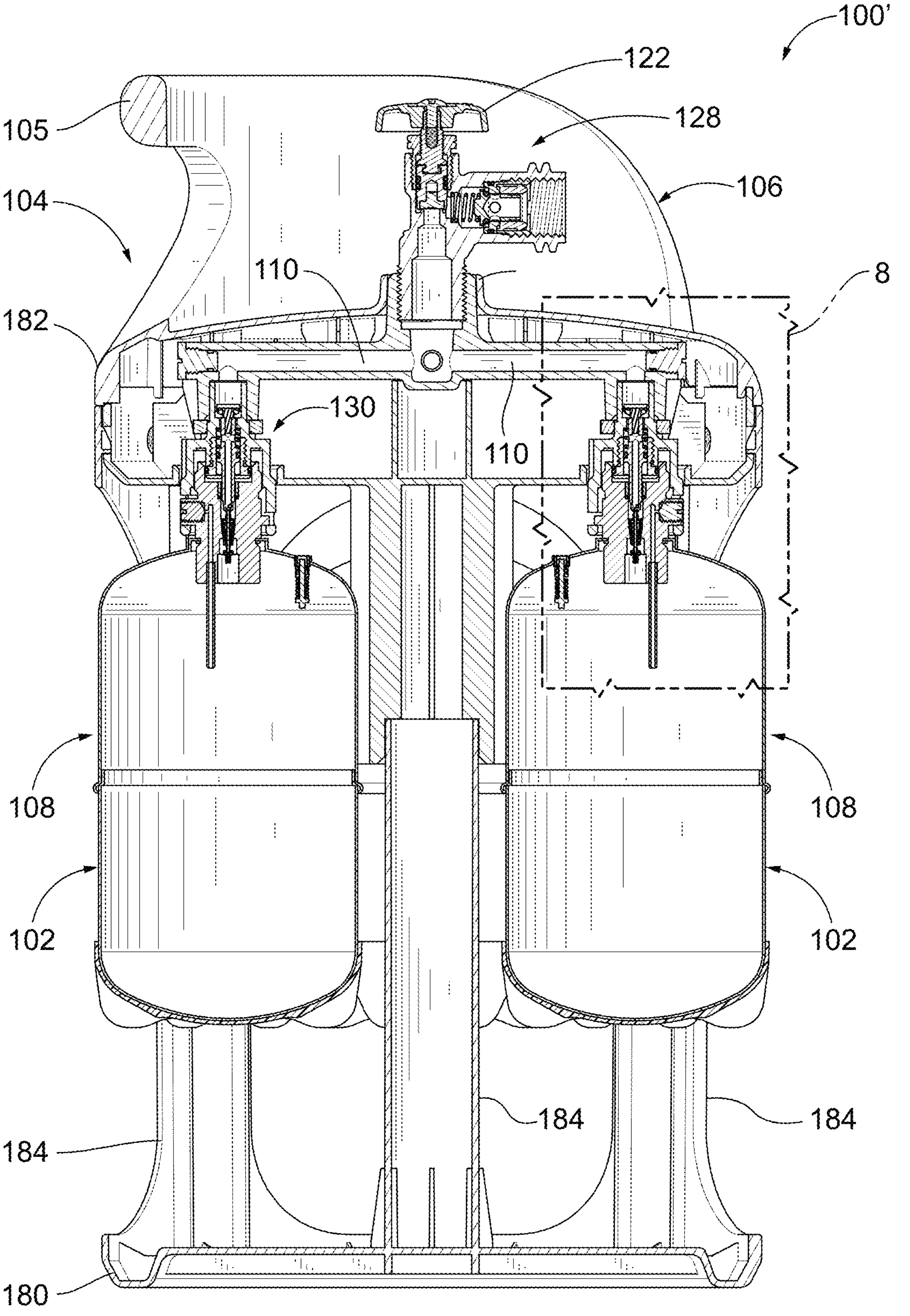
FIG. 7 is a cross-sectional side view of the refueling assembly of FIG. 5.
Figure 8:
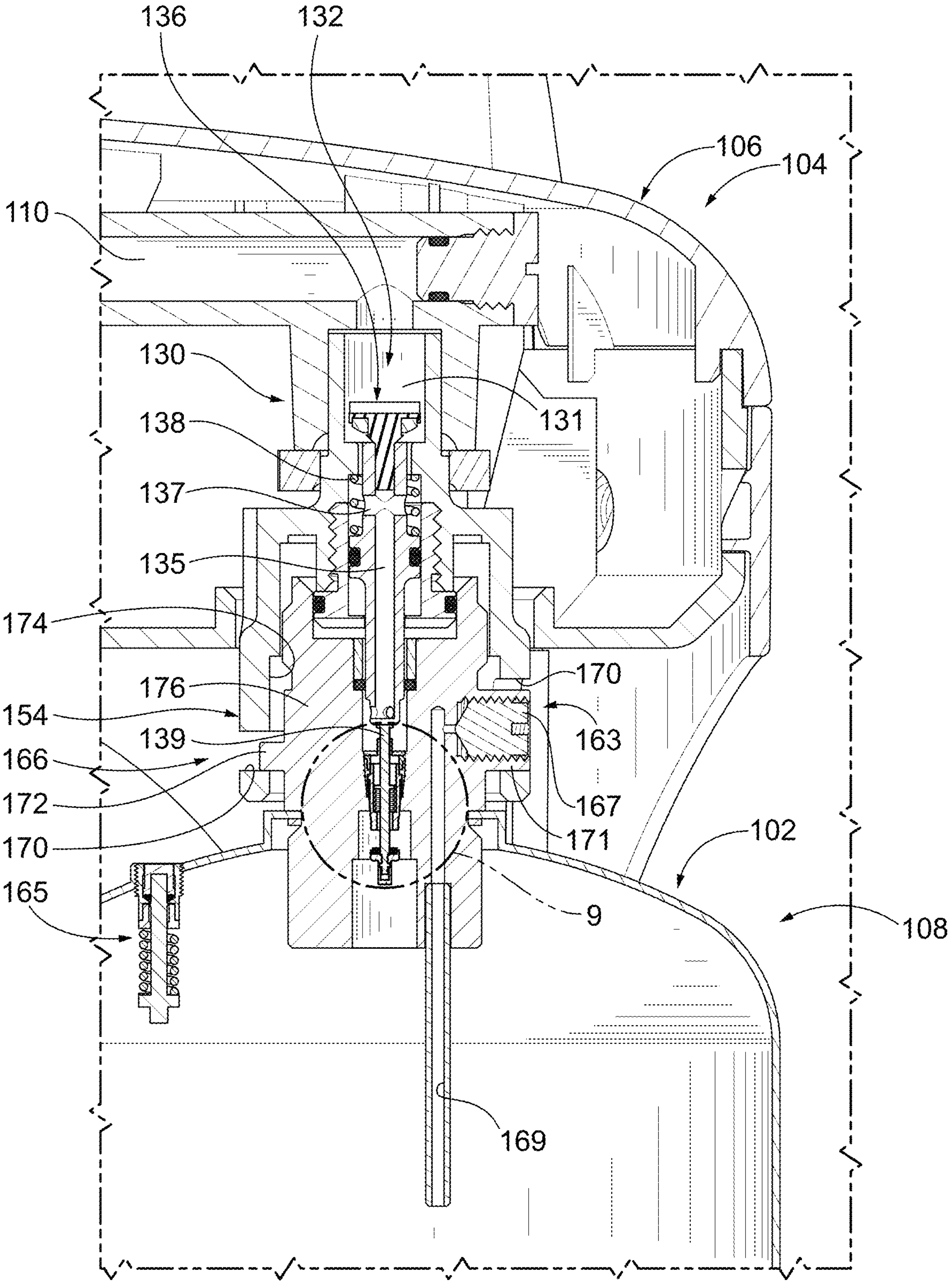
FIG. 8 is a detailed cross-sectional view of a portion of the refueling assembly of FIG. 5, corresponding to the detail of FIG. 7.
Figure 10:
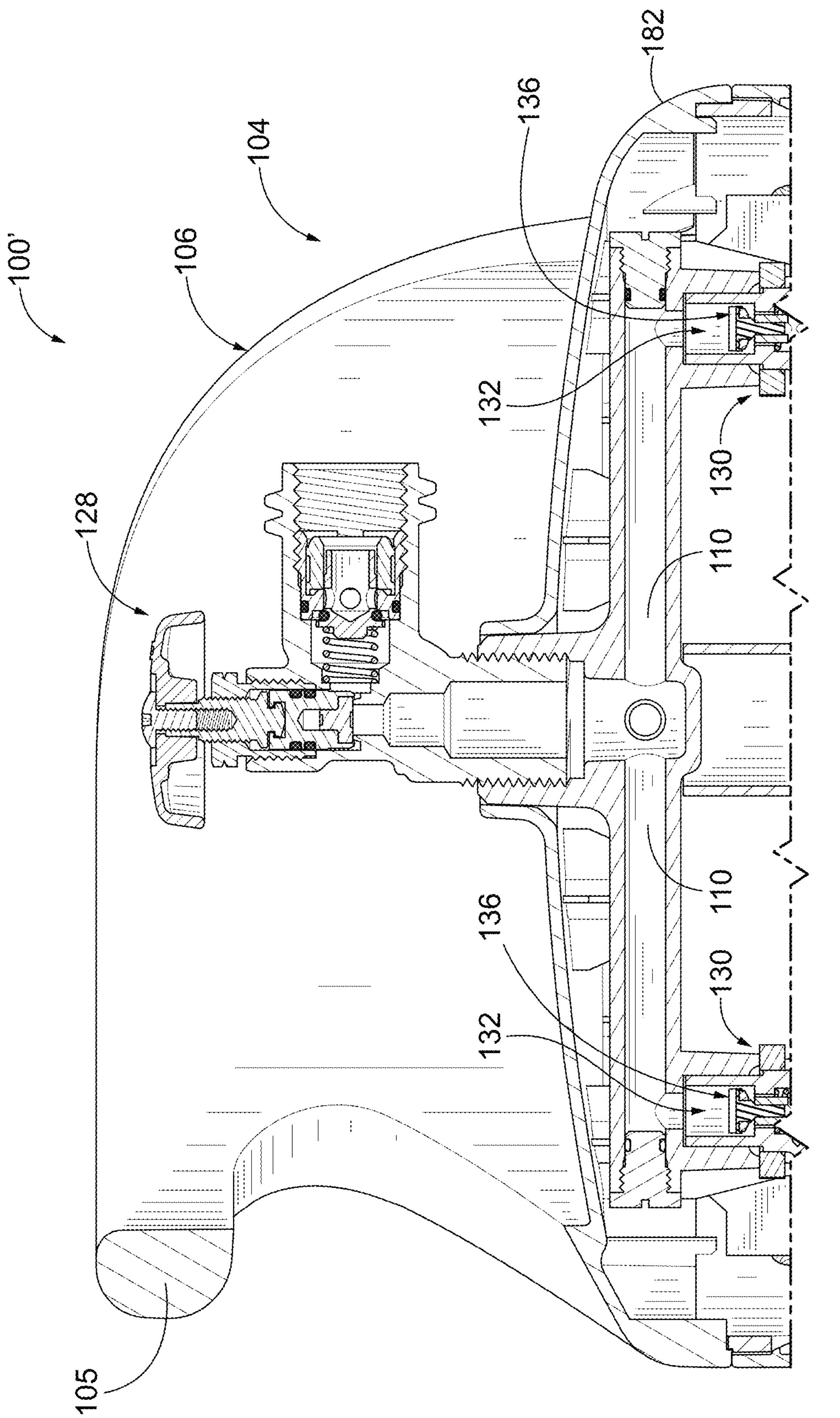
FIG. 10 is another detailed cross-section view of a portion of the refueling assembly of FIG. 5.

As best seen in at least FIGS. 6-7 and 10, the body 106 of chassis 104 of refueling assembly 100' defines a plurality of fuel conduits 110 and four docking-ports 108 for operative receipt of the four fuel tanks 102. Refueling assembly 100' comprises an OPD valve 128 that is configured to receive fuel from a fuel source into the fuel conduits 110. Refueling assembly 100' also comprises four docking-port valve assemblies 130, each comprising a docking-port valve 132, which is perhaps best seen in FIG. 8. Additionally, as also perhaps best seen in FIG. 8, the docking-port valves 132 each comprise a spring-biased valve member 136, which is configured to automatically open when coupled to a fuel tank 102. Specifically, docking-port valve 132 comprises a spring 138, which is compressed as a result of mutual engagement between spring-biased valve member 136 and fuel tank 102. With spring 138 compressed, as shown in FIG. 8, spring-biased valve member 136 is open and permits the fuel to pass through docking-port valve assembly 130 to fuel tank 102.

When fuel tank 102 is removed and disconnected from docking-port valve assembly 130, spring 138 returns to an expanded state (e.g., not compressed), resulting in spring-biased valve member 136 being closed. When closed, spring-biased valve member 136 prevents the fuel from exiting fuel conduit 110 through docking-port valve assembly 130. This ensures that the fuel cannot be expelled when fuel tank 102 is not connected to docking-port compartment 108.

Figure 9:
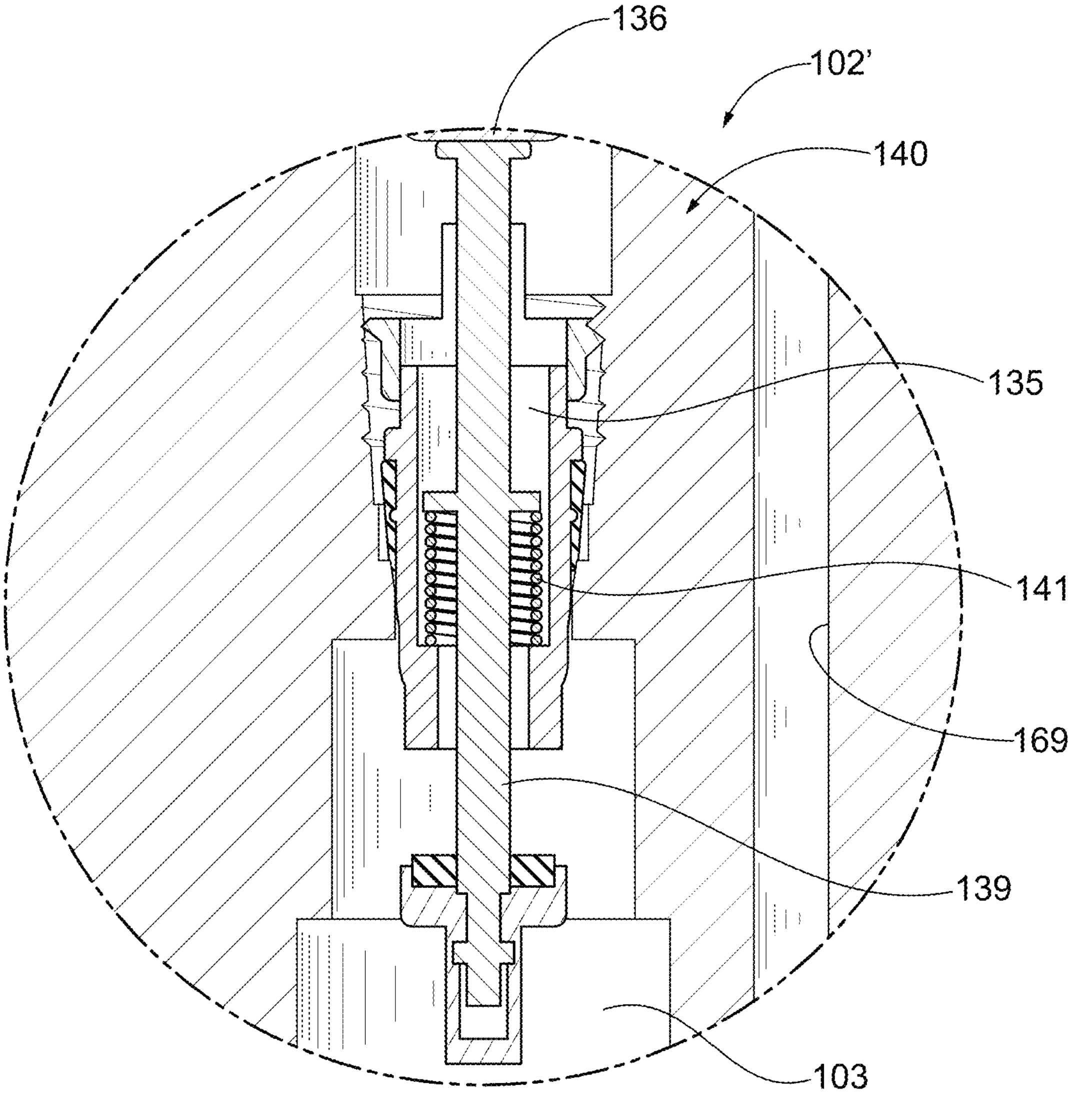
FIG. 9 is a further detailed cross-sectional view of a portion of the refueling assembly of FIG. 5, corresponding to the detail of FIG. 8.

As seen in FIG. 9, fuel tank 102 comprises a main cylinder valve 140 (which additionally or alternatively may be described as or referred to as a gas cylinder main valve), which automatically is opened as a result of mutual engagement with spring-biased valve member 136. With both spring-biased valve member 136 and main cylinder valve 140 open, the fuel is permitted to flow between the fuel conduit and fuel-tank chamber 103 through docking-port valve assembly 130.

Main cylinder valve 140 comprises a channel 135 (which additionally or alternatively may be described as or referred to as a gas cylinder channel), a driven unit 139 (which also may be referred to as a gas cylinder driven unit) positioned within the channel 135, and a spring 141 (which also may be referred to as a gas cylinder elastic unit) that biases the driven unit 139 away from the fuel-tank chamber 103. When the fuel tank 102 is operatively coupled to the docking-port valve assembly 130, the driven unit 139 of the main cylinder valve 140 of the fuel tank 102 engages the spring-biased valve member 136 of the docking-port valve 132 and causes both the main cylinder valve 140 and the docking-port valve 132 to open against their spring bias.

As best seen in FIG. 8, fuel tank 102 further comprises a fuel-tank bleeder valve 163 comprising a threaded plug 167 and a passage 169 extending into the fuel-tank chamber 103. When the threaded plug 167 is removed, pressurized fuel in the fuel-tank chamber 103 is permitted to escape via passage 169.

Refueling assembly 100' and associated fuel tanks 102 comprise an example of a bayonet-style connection mechanism for connecting fuel tank 102 to docking-port valve assembly 130 of refueling assembly 100'. FIG. 8 illustrates a sectional view of fuel-tank bayonet connector 166. As shown, fuel-tank bayonet connector 166 comprises a male bayonet member 176, a bayonet post 172 protruding from male bayonet member 176, and a protrusion 171 that protrudes from male bayonet member 176 and into which the threaded plug 167 of the fuel-tank bleeder valve 163 extends. With reference to FIGS. 6 and 8, fuel-tank bayonet connector 166 is configured to be operatively coupled to a docking-port bayonet connector 154 of docking-port valve assembly 130. Each docking-port bayonet connector 154 comprises a female receiving area 174 that is configured to receive male bayonet member 176. A pair of bayonet slots 170 (which also may be referred to as engagement slots) are formed in each female receiving area 174. A first one of bayonet slots 170 is configured to receive bayonet post 172 (which also may be referred to as an engagement unit and which is shown in FIG. 8), and a second one of bayonet slots 170 is configured to protrusion 171 (which also may be referred to as an engagement unit and which is shown in FIG. 8). As shown in FIG. 6, bayonet slots 170 are at least substantially L-shaped. Bayonet post 172 and protrusion 171 are configured to be inserted through a vertically extending portion of a respective bayonet slot 170 and then rotated to be positioned within a circumferentially extending portion of bayonet slot 170. This secures fuel-tank bayonet connector 166 to docking-port bayonet connector 154.

Figure 11:
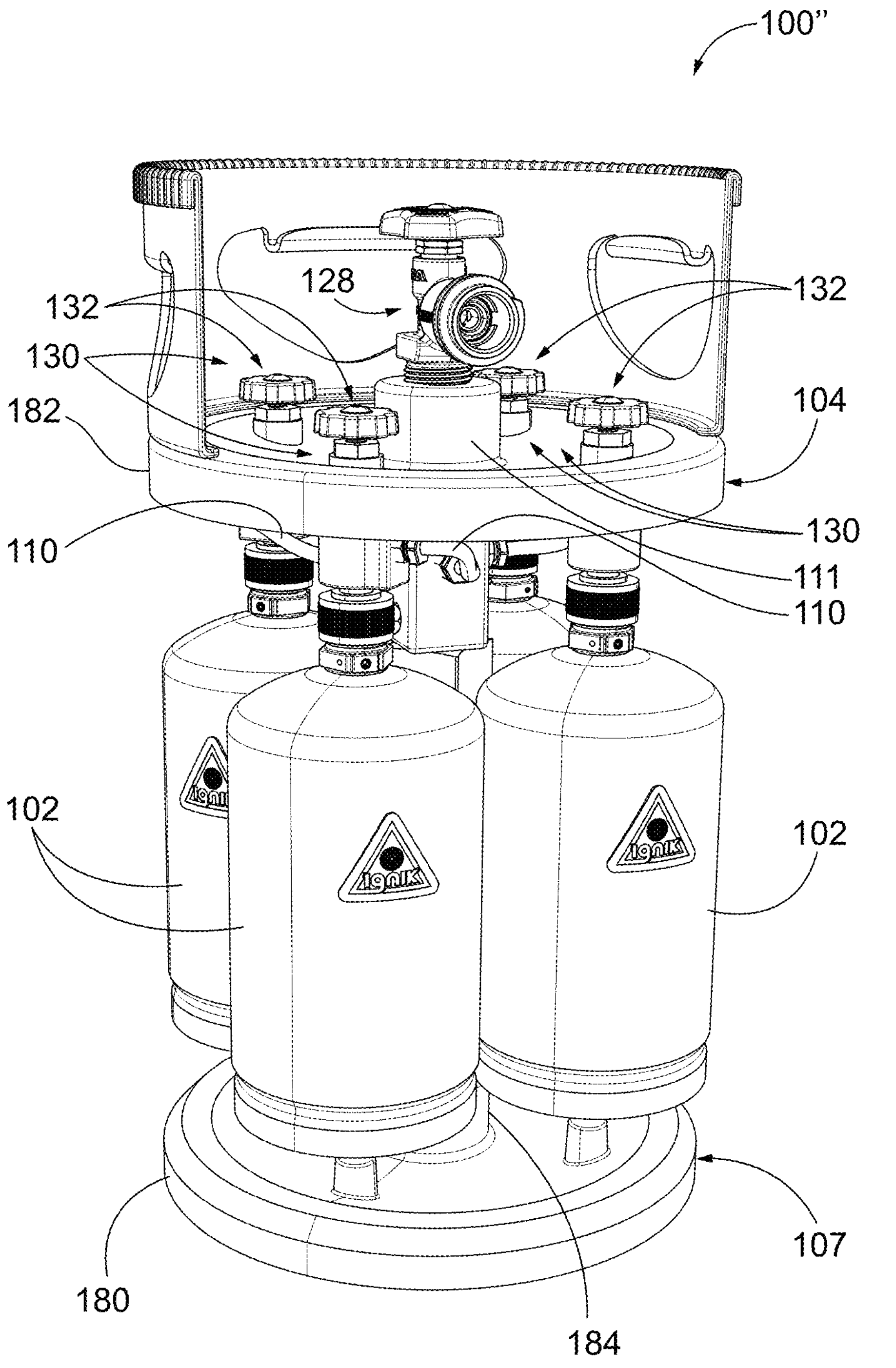
FIG. 11 is top isometric view of another example of a refueling assembly according to the present disclosure.

FIG. 11 illustrates another example of a refueling assembly 100, which is indicated at 100". As shown in FIG. 11, like refueling assembly 100' of FIGS. 5-10, refueling assembly 100" comprises a chassis 104 configured to operatively receive four fuel tanks 102. Also like refueling assembly 100', refueling assembly 100" comprises an OPD valve 128 that is configured to be coupled to any suitable fuel source or fuel-receiving device. Unlike refueling assembly 100' however, the docking-port valve assemblies 130 of refueling assembly 100" each comprise a docking-port valve 132 that is configured to be selectively opened and closed in response to user actuation of a docking-port valve actuator 134 in the form of a hand wheel. Unlike refueling assembly 100', refueling assembly 100" comprises an internal reservoir 111 and four external fuel conduits 110 that deliver fuel from the OPD valve 128 to the docking-port valves 132. The body of refueling assembly 100" includes a single internal supporting pillar 184 extending between the supporting base 180 and the supporting cover 182.

Figure 12:
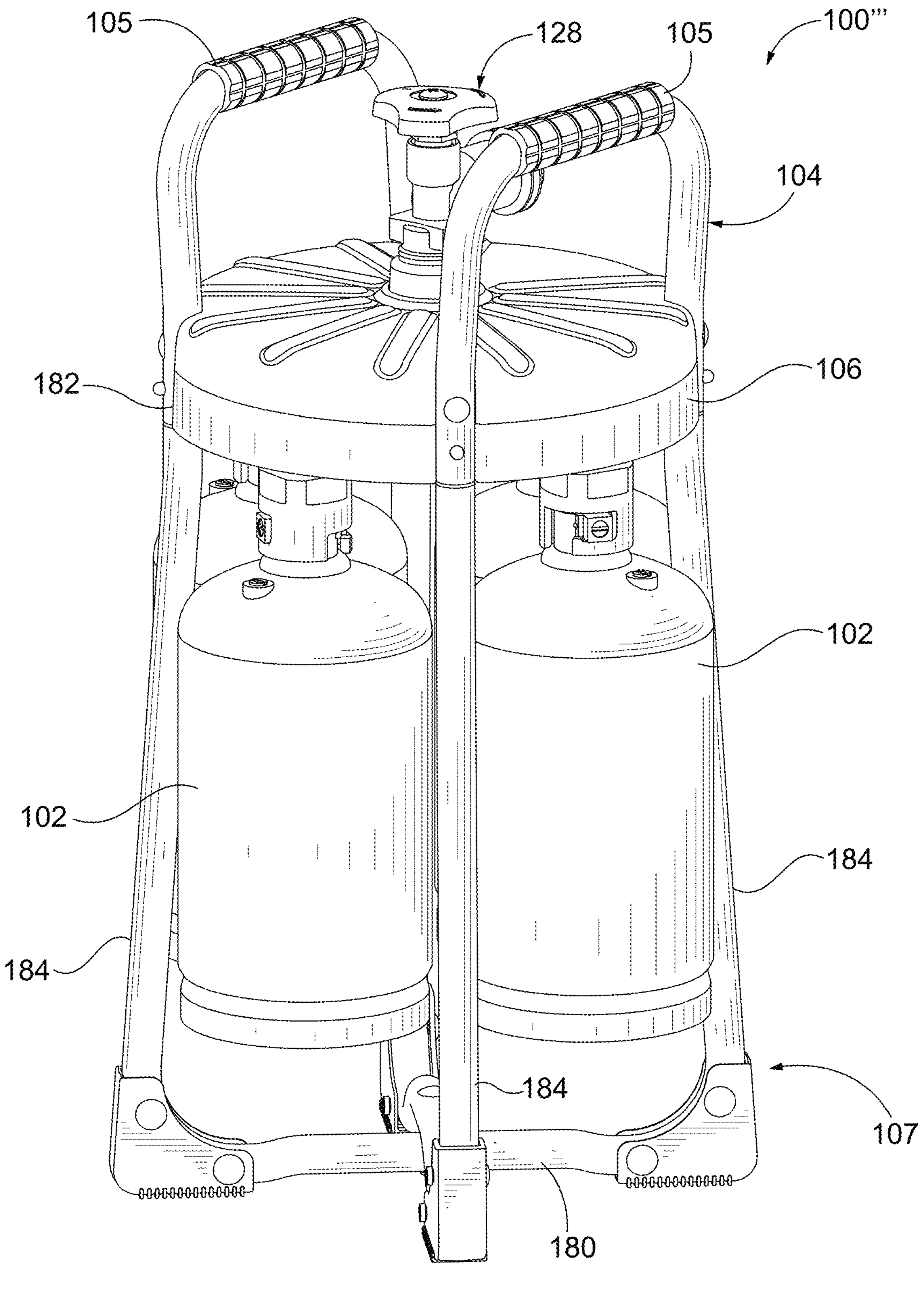
FIG. 12 is a top isometric view of another example of a refueling assembly according to the present disclosure.

FIG. 12 illustrates another example of a refueling assembly 100, which is indicated at 100'". Refueling assembly 100'" is functionally similar to refueling assembly 100', but with the body 106 comprising two handles 105 and four supporting pillars 184 extending between the supporting base 180 and the supporting cover 182.

Figure 13:
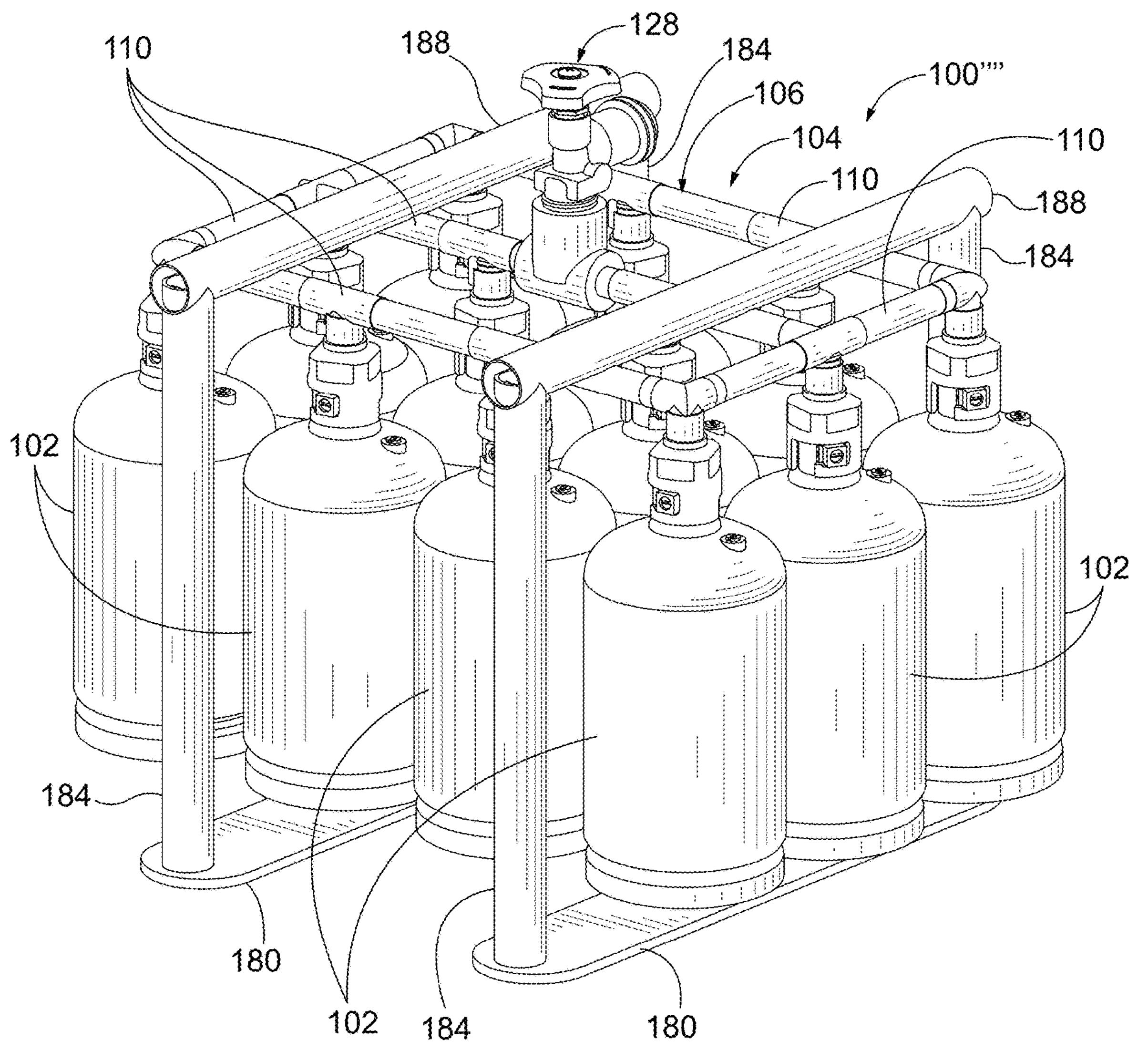
FIG. 13 is a top isometric view of another example of a refueling assembly according to the present disclosure.
Figure 14:
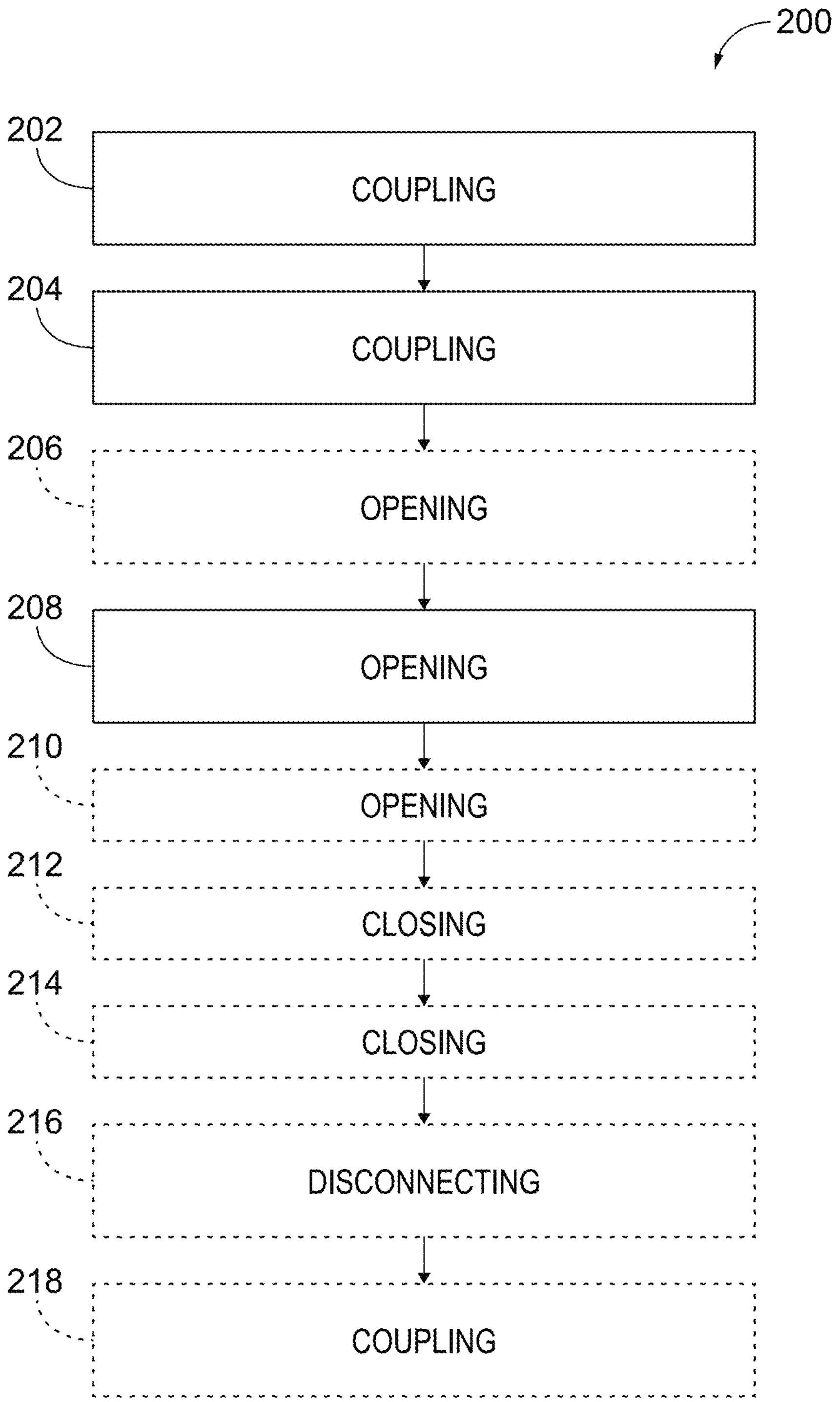
FIG. 14 is a flow chart schematically representing examples of methods according to the present disclosure.

FIG. 13 illustrates a further example of a refueling assembly 100, which is indicated at 100"". Refueling assembly 100"" is functionally similar to refueling assemblies 100' and 100"", but is configured to operatively receive twelve (12) fuel tanks 102. The body of refueling assembly 100"" has four supporting pillars 184 extending upward from two supporting bases 180 to two supporting members 188.

FIG. 14 is a flowchart schematically representing examples of methods 200 according to the present disclosure. In FIG. 14, some steps are illustrated in dashed boxes, indicating that such steps are optional or correspond to an optional version of methods 200 according to the present disclosure. That said, not all methods 200 according to the present disclosure are required to comprise each of the steps illustrated in solid boxes. The methods and steps illustrated in FIG. 14 are non-limiting, and other methods and steps are within the scope of the present disclosure, including methods having greater than or fewer than the number of steps illustrated, as understood from the discussion herein.

Methods 200 relate to utilizing refueling assemblies to refill one or more fuel tanks, including simultaneous refilling of two or more fuel tanks of a fuel tank. Methods 200 may include utilizing refueling assemblies 100 and fuel tanks 102 that are illustrated and discussed herein with reference to FIGS. 1-13. That is, refueling assemblies 100 and fuel tanks 102 that are illustrated and discussed herein with reference to FIGS. 1-13 may include any of the features, functions, properties, components, etc., as well as variants thereof, as those discussed herein with reference to methods 200 and FIG. 14 without requiring inclusion of all such features, functions, components, etc. Likewise, refueling assemblies 100 and fuel tanks 102 discussed herein in connection to methods 200 and FIG. 14 may incorporate any of the features, functions, properties, components, etc., as well as variants thereof, as those discussed herein with reference to FIGS. 1-13 without requiring inclusion of all such features, functions, components, etc.

As shown in FIG. 14, methods 200 include operatively coupling 202 each of one or more fuel tanks to a respective docking-port valve assembly of a refueling assembly 100. Coupling 202 may include fluidically connecting a docking-port connector of the docking-port valve assembly to a fuel tank connector of the fuel tank in any suitable manner dependent on the type of connection mechanism of the docking-port connector and the fuel tank connector. For example, coupling 202 may comprise mating a docking-port female threaded member with a fuel-tank male threaded member.

Methods 200 include operatively coupling 204 a fuel-source valve assembly of the refueling assembly to a fuel source. In some examples, the fuel source comprises a conventional propane tank filling station. The fuel-source valve assembly may comprise a conventional propane tank connector, e.g., a QCC1 connector, which is configured to be operatively and fluidically coupled to the fuel source.

In some examples, methods 200 include opening 206 a bleeder valve of the fuel-source valve assembly. When open, the bleeder valve is configured to automatically dispense fuel from a chassis fuel conduit assembly of the refueling assembly, in response to the amount of fuel in the chassis fuel conduit assembly exceeding a maximum threshold capacity. In some examples, opening 206 comprises twisting or otherwise turning or loosening a bleeder-valve screw of the bleeder valve. Opening 206 the bleeder valve is configured such that the maximum fuel capacity of the chassis fuel conduit assembly is not exceeded during refilling of the fuel tanks.

Methods 200 includes opening 208 a main valve of the fuel-source valve assembly. When open, the main valve permits fuel to enter the chassis fuel conduit assembly through the fuel-source valve assembly. In some examples, opening 208 the main valve comprises actuating a main-valve actuator, such as a hand wheel, crank, or screw. Opening 208 the main valve permits the fuel from the fuel source to pass through the fuel-source valve assembly into the chassis fuel conduit assembly.

The fuel that is received into the chassis fuel conduit assembly passes from the chassis fuel conduit assembly to the docking-port valve assemblies through a plurality of fuel conduits. As discussed, the fuel may pass or flow simultaneously to the docking-port valve assemblies and into the corresponding plurality of fuel tanks. In some examples, methods 200 include opening 210 one or more of the docking-port valves of the docking-port valve assemblies. Opening 210 the one or more docking-port valves permits the fuel to pass through the docking-port valve assemblies into the fuel tanks that are coupled to the docking-port valve assemblies. In some examples, opening 210 comprises actuating a docking-port valve actuator, such as a handwheel, a lever, a button, a crank, etc. Alternatively, in some examples, the docking-port valves may be configured to open automatically when coupled to the fuel tanks. In such examples, opening 210 may not be required.

In some examples, methods 200 include closing 212 the main valve and/or closing 214 the docking-port valves. For example, after the fuel tanks have each been refilled with the fuel, methods 200 may include closing 212 the main valve and closing 214 the docking-port valves. When the main valve is closed, the fuel is prevented from passing from the fuel source to the chassis fuel conduit assembly through the fuel-source valve assembly. When the docking-port valves are closed, the fuel is prevented from passing from the chassis fuel conduit assembly through the fuel-source valve assemblies into the fuel tanks. In some examples, closing 212 the main valve and/or closing 214 the docking-port valves may comprise actuating the main-valve actuator and/or the docking-port valve actuator.

In some examples, methods 200 comprise disconnecting 216 one or more of the fuel tanks from the docking-port valves assemblies. After the one or more fuel tanks receive the fuel, the one or more fuel tanks may be disconnected from the refueling assembly and utilized to provide fuel for any suitable fuel-receiving device, e.g., a gas powered grill, a stove, etc. Alternatively, in some examples, methods 200 include coupling 218 the fuel-source valve assembly of the refueling assembly to any suitable fuel-receiving device. In such examples, the fuel that is stored in the chassis fuel conduit assembly and/or the fuel tanks may be utilized to provide fuel for the fuel-receiving device through the fuel-source valve assembly.

As used herein, the term “and/or” placed between a first entity and a second entity means one of (1) the first entity, (2) the second entity, and (3) the first entity and the second entity. Multiple entities listed with “and/or” should be construed in the same manner, i.e., “one or more” of the entities so conjoined. Other entities may optionally be present other than the entities specifically identified by the “and/or” clause, whether related or unrelated to those entities specifically identified. Thus, as a non-limiting example, a reference to “A and/or B,” when used in conjunction with open-ended language such as “comprising” may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase “at least one,” in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase “at least one” refers, whether related or unrelated to those entities specifically identified. Thus, as a non-limiting example, “at least one of A and B” (or, equivalently, “at least one of A or B,” or, equivalently “at least one of A and/or B”) may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases “at least one,” “one or more,” and “and/or” are open-ended expressions that are both conjunctive and disjunctive in operation. For example, each of the expressions “at least one of A, B, and C,” “at least one of A, B, or C,” “one or more of A, B, and C,” “one or more of A, B, or C,” and “A, B, and/or C” may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms “adapted” and “configured” mean that the element, component, or other subject matter is designed and/or intended to perform a given function. Thus, the use of the terms “adapted” and “configured” should not be construed to mean that a given element, component, or other subject matter is simply “capable of” performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

Illustrative, non-exclusive examples of refueling assemblies 100, fuel tanks 102, and associated methods 200 according to the present disclosure are presented in the following enumerated paragraphs.

A. a Refueling Assembly (100), Comprising:

a chassis (104) comprising a body (106) defining a plurality of docking ports (108) configured to operatively and respectively receive a plurality of fuel tanks (102);

at least one fuel conduit (110) supported by the body (106) and/or defined by the body (106);

a plurality of docking-port valve assemblies (130) supported by the body (106), in fluid communication with the at least one fuel conduit (110), and configured to be operatively coupled to the plurality of fuel tanks (102) when the plurality of fuel tanks (102) are operatively positioned in the plurality of docking ports (108); and a fuel-source valve assembly (112) supported by the body (106), in fluid communication with the at least one fuel conduit (110), and configured to be operatively coupled to a fuel source (114) to selectively permit fuel from the fuel source (114) to be operatively delivered to the plurality of fuel tanks (102) when the plurality of fuel tanks (102) are operatively coupled to the plurality of docking-port valve assemblies (130).

A1. The refueling assembly (100) of paragraph A, wherein the at least one fuel conduit (110) comprises a plurality of fuel conduits (110) fluidically coupling the fuel-source valve assembly (112) to the plurality of docking-port valve assemblies (130).

A2. The refueling assembly (100) of paragraph A or A1, wherein the plurality of docking ports (108) comprises at least 2 docking ports (108), at least 3 docking ports (108), at least 4 docking ports (108), at least 6 docking ports (108), at least 8 docking ports (108), at least 10 docking ports (108), at least 12 docking ports (108), at most 24 docking ports (108), at most 20 docking ports (108), at most 16 docking ports (108), at most 12 docking ports (108), at most 8 docking ports (108), at most 6 docking ports (108), and/or at most 4 docking ports (108).

A3. The refueling assembly (100) of any of paragraphs A-A2, wherein each docking-port valve assembly (130) of the plurality of docking-port valve assemblies (130) comprises a docking-port connector (144) that is configured to be operatively coupled to a fuel tank connector (146) of a respective fuel tank (102) of the plurality of fuel tanks (102) when the respective fuel tank (102) is operatively positioned in a respective docking port (108) of the plurality of docking ports (108) to fluidically couple the respective docking-port valve assembly (130) to the respective fuel tank (102).

A3.1. The refueling assembly (100) of paragraph A3, wherein the docking-port connector (144) comprises a docking-port threaded member (150) configured to operatively couple to the respective fuel tank (102) of the plurality of fuel tanks (102).

A3.1.1. The refueling assembly (100) of paragraph A3.1, wherein the docking-port threaded member (150) comprises a docking-port female threaded member (152).

A3.2. The refueling assembly (100) of paragraph A3, wherein the docking-port connector (144) comprises a docking-port bayonet connector (154).

A3.2.1. The refueling assembly (100) of paragraph A3.2, wherein the docking-port bayonet connector (154) comprises a female receiving area (174) and a bayonet slot (170), wherein the bayonet slot (170) is configured to receive a bayonet post (172) of the respective fuel tank (102) to operatively secure the respective fuel tank (102) to the respective docking-port valve assembly (130).

A4. The refueling assembly (100) of any of paragraphs A-A2, further comprising a plurality of adapters (148), wherein each adapter (148) of the plurality of adapters (148) is configured to be operatively coupled to a fuel tank (102) of the plurality of fuel tanks (102) and to a respective docking-port valve assembly (130) to operatively permit the fuel to pass from the respective docking-port valve assembly (130) through the respective adapter (148) and into the respective fuel tank (102).

A4.1. The refueling assembly (100) of paragraph A4, wherein each adapter (148) of the plurality of adapters (148) comprises:

an adapter port connector (149), wherein each docking-port valve assembly (130) of the plurality of docking-port valve assemblies (130) comprises a/the docking-port connector (144) that is configured to be operatively coupled to the adapter port connector (149); and an adapter tank connector (151) configured to be operatively coupled to a respective fuel tank (102).

A4.1.1. The refueling assembly (100) of paragraph A4.1, wherein the docking-port connector (144) is not configured to be operatively coupled directly to a/the fuel tank connector (146) of a respective fuel tank (102) of the plurality of fuel tanks (102).

A4.1.2. The refueling assembly (100) of any of paragraphs A4.1-A4.1.1, wherein the adapter port connector (149) comprises an adapter-port threaded member and the docking-port connector (144) comprises a/the docking-port threaded member (150) configured to be operatively coupled to the adapter-port threaded member.

A4.1.2.1. The refueling assembly (100) of paragraph A4.1.2, wherein the adapter-port threaded member comprises a male threaded member, and wherein the docking-port connector (144) comprises a/the docking-port female threaded member (152).

A4.2. The refueling assembly (100) of any of paragraphs A4-A4.1.2.1, wherein each adapter (148) comprises an/the adapter tank connector (151) configured to be operatively coupled to a conventional male threaded connector of the fuel tank (102).

A4.2.1. The refueling assembly (100) of paragraph A4.2, wherein the conventional male threaded connector is a conventional 1-20 UNEF threaded connector.

A4.3.2. The refueling assembly (100) of any of paragraphs A4-A4.2.1, wherein each adapter (148) of the plurality of adapters (148) is at least one of fixedly secured to and integrally formed with a respective fuel tank (102) of the plurality of fuel tanks (102).

A4.3.3. The refueling assembly (100) of any of paragraphs A4-A4.3.2, wherein each fuel tank (102) of the plurality of fuel tanks (102) includes a fuel-tank male threaded member (162) configured to be operatively coupled to a fuel-receiving device (116) to deliver fuel from the fuel tank (102) to the fuel-receiving device (116), and wherein a/the adapter tank connector (151) is not configured to be operatively coupled to the male coupling member.

A5. The refueling assembly (100) of any of paragraphs A-A4.2.1, further comprising at least one fuel tank (102) operatively coupled to a respective docking-port valve assembly (130) of the plurality of docking-port valve assemblies (130), and optionally further comprising a/the plurality of fuel tanks (102), each operatively coupled to a respective docking-port valve assembly (130) of the plurality of docking-port valve assemblies (130).

A5.1. The refueling assembly (100) of paragraph A5, wherein each of the at least one fuel tank (102) comprises a/the fuel tank connector (146).

A5.1.1. The refueling assembly (100) of paragraph A5.1, wherein the fuel tank connector (146) is configured to be operatively coupled to a/the docking-port connector (144) of a respective docking-port valve assembly (130) of the plurality of docking-port valve assemblies (130).

A5.1.2. The refueling assembly (100) of any of paragraphs A5.1-A5.1.1, wherein the fuel tank connector (146) comprises a/the fuel-tank male threaded member (162), wherein the fuel-tank male threaded member (162) is configured to operatively couple the at least one fuel tank (102) to a/the fuel-receiving device (116) to permit fuel to pass from the at least one fuel tank (102) to the fuel-receiving device (116).

A5.1.3. The refueling assembly (100) of any of paragraphs A5.1-A5.1.1, wherein the at least one fuel tank (102) comprises a/the fuel-tank male threaded member (162) configured to operatively couple the at least one fuel tank (102) to a/the fuel-receiving device (116) to permit fuel to pass from the at least one fuel tank (102) to the fuel-receiving device (116), and wherein the fuel tank connector (146) is distinct from the fuel-tank male threaded member (162).

A5.1.3.1. The refueling assembly (100) of paragraph A5.1.3, wherein the fuel tank connector (146) comprises a fuel-tank male threaded collar (164) extending around the fuel-tank male threaded member (162).

A5.1.3.2. The refueling assembly (100) of paragraph A5.1.3, wherein the fuel tank connector (146) comprises a fuel-tank bayonet connector (166) comprising a/the bayonet post (172), and wherein a/the docking-port connector (144) comprises a/the docking-port bayonet connector (154) comprising a/the bayonet slot (170) configured to receive the bayonet post (172) to secure the at least one fuel tank (102) to the respective docking-port valve assembly (130).

A5.1.4. The refueling assembly (100) of paragraph A5.1, wherein the fuel tank connector (146) is configured to be operatively coupled to an/the adapter (148), wherein the adapter (148) is configured to be operatively coupled to the at least one fuel tank (102) and to the respective docking-port valve assembly (130) to permit the fuel to pass from the respective docking-port valve assembly (130) through the adapter (148) and into the at least one fuel tank (102).

A5.1.4.1. The refueling assembly (100) of paragraph A5.1.4, wherein the adapter (148) comprises an/the adapter tank connector (151), and wherein the fuel tank connector (146) is configured to be operatively coupled to an/the adapter port connector (149).

A5.1.4.2. The refueling assembly (100) of any of paragraphs A5.1.4-A5.1.4.1, wherein the fuel tank connector (146) is not configured to be operatively coupled directly to a/the docking-port connector (144) of a respective docking-port valve assembly (130) of the docking-port valve assemblies (130).

A5.1.4.3. The refueling assembly (100) of any of paragraphs A5.1.4-A5.1.4.2, wherein the adapter (148) comprises an adapter-tank threaded member and the fuel tank (102) comprises a/the fuel-tank male threaded member (162) configured to be operatively coupled the adapter-tank threaded member.

A5.1.4.3.1. The refueling assembly (100) of paragraph A5.1.4.3, wherein the adapter-tank threaded member comprises a female adapter-tank threaded member, and wherein the fuel tank connector (146) comprises the fuel-tank male threaded member (162).

A6. The refueling assembly (100) of any of paragraphs A-A5.1.4.3.1, wherein each fuel tank (102) of the plurality of fuel tanks (102) is configured to hold a volume of gaseous fuel.

A6.1. The refueling assembly (100) of paragraph A6, wherein the gaseous fuel is or includes propane and/or butane.

A7. The refueling assembly (100) of any of paragraphs A-A6.1, wherein each of the plurality of fuel tanks (102) defines a fuel-tank chamber (103) configured to receive and selectively store at least 10 ounces (oz.), at least 12 oz., at least 14 oz. at least 16 oz., at least 18 oz., at least 20 oz., at most 32 oz., at most 26 oz., at most 22 oz., at most 18 oz., and/or at most 16 oz. of the fuel.

A8. The refueling assembly (100) of any of paragraphs A-A7, wherein the fuel-source valve assembly (112) comprises:

a fuel-source connector (118) configured to be operatively coupled to the fuel source (114) to receive the fuel from the fuel source (114) into the at least one fuel conduit (110);

a main valve (120) configured to be selectively opened and closed, wherein, when the main valve (120) is open, the main valve (120) is configured to permit the fuel to pass through the fuel-source valve assembly (112) into the at least one fuel conduit (110), and when the main valve (120) is closed, the main valve (120) is configured to prevent the fuel from passing through the fuel-source valve assembly (112) into the at least one fuel conduit (110); and a main-valve actuator (122) configured to be actuated to selectively open and close the main valve (120).

A8.1. The refueling assembly (100) of paragraph A8, wherein the fuel-source valve assembly (112) further comprises a pressure relief valve (126) configured to automatically open in response to a threshold pressure in the at least one fuel conduit (110), wherein, when the pressure relief valve (126) is open, the pressure relief valve (126) is configured to permit the fuel to exit the at least one fuel conduit (110) through the pressure relief valve (126).

A8.2. The refueling assembly (100) of paragraph A8 or A8.1, wherein the fuel-source valve assembly (112) further comprises a bleeder valve (124) configured to be selectively opened and closed, wherein, when the bleeder valve (124) is opened, the bleeder valve (124) is configured to automatically release a portion of the fuel from the at least one fuel conduit (110) in response to an amount of the fuel in the at least one fuel conduit (110) exceeding a maximum amount.

A8.3. The refueling assembly (100) of any of paragraphs A8-A8.2, wherein the fuel-source valve assembly (112) comprises an Overfill Protection Device (OPD) valve (128).

A9. The refueling assembly (100) of any of paragraphs A-A8.3, wherein the fuel-source valve assembly (112) is configured to selectively dispense the fuel from the at least one fuel conduit (110) and/or the fuel tanks (102) into a fuel receiver coupled to the fuel-source valve assembly (112).

A10. The refueling assembly (100) of any of paragraphs A-A9, wherein each docking-port valve assembly (130) of the plurality of docking-port valve assemblies (130) comprises a docking-port valve (132) that is configured to be selectively opened and closed, wherein, when the docking-port valve (132) is open, the docking-port valve (132) is configured to permit the fuel to pass between the at least one fuel conduit (110) and a respective fuel tank (102) of the plurality of fuel tanks (102) through a respective docking-port valve assembly (130), and when the docking-port valve (132) is closed, the docking-port valve (132) is configured to prevent the fuel from passing between the at least one fuel conduit (110) and the respective fuel tank (102) through the respective docking-port valve assembly (130).

A10.1. The refueling assembly (100) of paragraph A10, wherein the docking-port valve assembly (130) further comprises a docking-port valve actuator (134), wherein the docking-port valve actuator (134) is configured to be actuated by a user to selectively open and close the docking-port valve (132).

A10.2. The refueling assembly (100) of paragraph A10, wherein the docking-port valve (132) is configured to automatically open in response to engagement with the respective fuel tank (102) when the respective fuel tank (102) is operatively coupled to the respective docking-port valve assembly (130).

A10.2.1. The refueling assembly (100) of paragraph A10.2, wherein the docking-port valve (132) is configured to automatically close in response to disengagement from the respective fuel tank (102) when the respective fuel tank (102) is disconnected from the respective docking-port valve assembly (130).

A11. The refueling assembly (100) of any of paragraphs A-A10.2.1, wherein the body (106) defines or comprises an internal reservoir (111).

A12. The refueling assembly (100) of any of paragraphs A-A11, wherein the chassis (104) further comprises a handle (105) configured to be held by a/the user to transport the refueling assembly (100).

A13. The refueling assembly (100) of any of paragraphs A-A12, wherein the chassis (104) comprises a stand (107) configured to maintain the chassis (104) in an upright position.

A14. The refueling assembly (100) of any of paragraphs A-A13, wherein the plurality of fuel tanks (102) comprise propane tanks, comprising a/the fuel-tank chambers (103) configured to receive and store at least 12 oz. and at most 22 oz. of the fuel.

B. A fuel tank (102), comprising:

a fuel-tank chamber (103) configured to receive and store a fuel; and a fuel-tank male threaded member (162) configured to be operatively coupled to a fuel-receiving device (116) to permit the fuel to pass from the fuel-tank chamber (103) to the fuel-receiving device (116).

B1. The fuel tank (102) of paragraph B, wherein the fuel-tank male threaded member (162) has a 1-inch diameter and 20 threads per inch.

B2. The fuel tank (102) assembly of paragraph B or B1, further comprising a fuel tank connector (146) configured to be operatively coupled directly to a refueling assembly (100) to permit the fuel from the refueling assembly (100) to be received into the fuel-tank chamber (103).

B2.1. The fuel tank (102) of paragraph B2, wherein the fuel tank connector (146) comprises a fuel-tank male threaded collar (164) extending around the fuel-tank male threaded member (162).

B2.1.1. The fuel tank (102) of paragraph B2.1, wherein the fuel-tank male threaded collar (164) has a 1.5-inch diameter.

B2.2. The fuel tank (102) of paragraph B2, wherein the fuel tank connector (146) comprises a fuel-tank bayonet connector (166) comprising a bayonet post (172).

B2.3. The fuel tank (102) of any of paragraphs B2-B2.2, wherein the fuel tank connector (146) is distinct from the fuel-tank male threaded member (162).

B2.4. The fuel tank (102) of paragraph B2, wherein the fuel tank connector (146) comprises the fuel-tank male threaded member (162).

B3. The fuel tank (102) of paragraph B or B1, further comprising an adapter (148) configured to operatively couple the fuel-tank male threaded member (162) to a refueling assembly (100) to permit the fuel from the refueling assembly (100) to pass through the adapter (148) into the fuel-tank chamber (103).

B3.1. The fuel tank (102) of paragraph B3, wherein the adapter (148) comprises:

an adapter tank connector (151) configured to be operatively coupled to the fuel-tank male threaded member (162); and an adapter port connector (149) configured to be operatively coupled to a docking-port valve assembly (130) of the refueling assembly (100).

B4. The fuel tank (102) of any of paragraphs B-B3.1, wherein the fuel tank (102) is a fuel tank of any of paragraphs A-A14.

B5. The fuel tank (102) of any of paragraphs B-B4, wherein the fuel tank (102) further comprises a main cylinder valve (140) configured to be selectively opened and closed, wherein, when the main cylinder valve (140) is open, the main cylinder valve (140) is configured to selectively permit the fuel from a fuel source (114) to enter the fuel-tank chamber (103), and wherein, when the main cylinder valve (140) is closed, the main cylinder valve (140) is configured to prevent the fuel from entering into the fuel-tank chamber (103).

B5.1. The fuel tank (102) of paragraph B5, wherein the main cylinder valve (140) is configured to open automatically in response to the fuel applying at least a threshold opening pressure on the main cylinder valve (140).

B5.2. The fuel tank (102) of paragraph B5, wherein the main cylinder valve (140) is configured to open automatically in response to mutual engagement with a/the docking-port valve assembly (130) of a/the refueling assembly (100).

B6. The fuel tank (102) of any of paragraphs B-B5.2, wherein the fuel tank (102) is configured to be operatively coupled to a respective docking-port valve assembly (130) of the docking-port valve assemblies (130) of the refueling assembly (100) of any one of paragraphs A-A14.

C. A tank-refueling system comprising the refueling assembly (100) of any one of paragraphs A-A14 and the fuel tank (102) of any one of paragraphs B-B6.

D. A gas cylinder filling device configured to be connected to a gas source and capable of filling fluid, the gas cylinder filling device comprising:
- a supporting stand;
- a main valve mounted on the supporting stand and comprising:
  - an inlet configured to be connected to the gas source;
  - a main channel connected to the inlet; and
  - a main switch being capable of blocking or fluidly connecting the inlet from or with the main channel;
- multiple dispensing channels mounted on the supporting stand and connected to the main channel; and
- multiple connecting seats; each one of the connecting seats mounted on and connected to a respective dispending channel of the dispensing channels; each one of the connecting seats comprising a connecting channel connected to the respective dispensing channel.

D1. The gas cylinder filling device of paragraph D, wherein the gas cylinder filling device further comprises:
- multiple gas cylinders; each one of the gas cylinders detachably mounted on a respective connecting seat of the connecting seats, and each one of the gas cylinders comprising:
  - a gas cylinder valve mounted on an opening of the gas cylinder, and the gas cylinder valve detachably mounted on the respective connecting seat; when the gas cylinder valve is mounted on the respective connecting seat, the connecting channels fluidly communicate with interiors of the corresponding gas cylinders via the gas cylinder valves.

D2. The gas cylinder filling device of paragraph D1, wherein:
- each one of the connecting seats comprises:
  - a valve rod mounted in the connecting channel and comprising:
    - a hollow channel formed through the valve rod, such that the valve rod is a hollow rod; and
    - at least one connecting hole formed on the valve rod and through a wall of the valve rod; the at least one connecting hole fluidly communicating with the connecting channel and the hollow channel;
  - a connecting elastic unit pressing against the valve rod;
- each one of the gas cylinder valves comprises:
  - a gas cylinder channel formed through the gas cylinder valve and being capable of fluidly communicating with the connecting channel and the interior of the gas cylinder;
  - a gas cylinder driven unit movably mounted through the gas cylinder channel and being capable of blocking the connecting channel and the interior of the gas cylinder;
  - a gas cylinder elastic unit being capable of moving the gas cylinder driven unit toward an exterior of the gas cylinder and being capable of making the gas cylinder driven unit block the interior of the gas cylinder and the exterior of the gas cylinder;
- when each one of the gas cylinder valves is mounted on the respective connecting seat, the connecting elastic unit presses against the valve rod and makes the valve rod push against the gas cylinder driven unit, so that the gas cylinder driven unit is moved against the gas cylinder elastic unit and the connecting channel fluidly communicates with the interior of the gas cylinder.

D3. The gas cylinder filling device of any of paragraphs D1-D2, wherein:
- each one of the connecting seats comprises:
  - an engagement slot formed on a wall of the connecting seat; and each one of the gas cylinder valves comprises:
  - an engagement unit protruding from an outer wall of the gas cylinder valve; when the gas cylinder valves are mounted on the connecting seat, the engagement unit is located in the engagement slot.

D4. The gas cylinder filling device of any of paragraphs D1-D3, wherein each one of the gas cylinder valves comprises:
- an outlet pipe extending from the gas cylinder valve to the interior of the gas cylinder;
- an outlet opening being capable of fluidly communicating with the outlet pipe and an/the exterior of the gas cylinder;
- a sealing plug mounted through the outlet opening and being capable of selectively blocking or connecting the outlet pipe from or to the outlet opening.

D5. The gas cylinder filling device of paragraph D4, wherein the outlet opening of each one of the gas cylinder valves is formed on an/the engagement unit of the gas cylinder valve.

D6. The gas cylinder filling device of any of paragraphs D1-D5, wherein the gas cylinder filling device comprises four said connecting seats and four said gas cylinders.

D7. The gas cylinder filling device of any of paragraphs D-D6, wherein the main valve comprises:
- a main driven unit mounted in the inlet and being capable of blocking the inlet and the main channel; when the gas source is connected to the inlet, the gas source moving the main driven unit and fluidly communicating with the inlet to the main channel; and
- a main elastic unit mounted in the inlet; the main elastic unit pressing against the main driven unit, such that the main driven unit is capable of blocking the gas source and the main channel.

D8. The gas cylinder filling device of any of paragraphs D-D7, wherein the main switch of the main valve comprises:
- a main sealing unit mounted between the inlet and the main channel, and being capable of blocking the inlet from or facilitating the inlet to fluidly communicate with the main channel; and
- a main driving unit being capable of moving the main sealing unit, and facilitating the main sealing unit to block the inlet from or to allow the inlet to fluidly communicate with the main channel.

D9. The gas cylinder filling device of any of paragraphs D-D8, wherein the supporting stand comprises:
- a supporting base;
- a supporting cover mounted on a top of the supporting base, the main valve and the connecting seats mounted on the supporting cover;

at least one supporting pillar mounted between the supporting base and the supporting cover and being capable of supporting the supporting cover; and a handle formed on the supporting cover.

E. A method (200) of refilling a plurality of fuel tanks (102), the method (200) comprising:

operatively coupling (202) each fuel tank (102) of the plurality of fuel tanks (102) to a refueling assembly (100);

operatively coupling (204) a fuel-source valve assembly (112) of the refueling assembly (100) to a fuel source (114); and opening (208) a main valve (120) of the fuel-source valve assembly (112).

E1. The method (200) of paragraph E, wherein the opening (208) the main valve (120) causes the plurality of fuel tanks (102) to fill simultaneously.

E2. The method (200) of any of paragraphs E-E1, wherein the coupling (202) each fuel tank (102) comprises operatively coupling each fuel tank (102) to a respective docking-port valve assembly (130) of the refueling assembly (100); and wherein the method (200) further comprises opening (210) a docking-port valve (132) of each docking-port valve assembly (130).

E2.1. The method (200) of paragraph E2, further comprising closing (214) one or more of the docking-port valves (132).

E3. The method (200) of any of paragraphs E-E2.1, further comprising opening (206) the main valve (120) of the fuel-source valve assembly (112) prior to the opening (208) the fuel-source valve assembly (112).

E4. The method (200) of any of paragraphs E-E3, further comprising closing (212) the main valve (120).

E5. The method (200) of any of paragraphs E-E4, further comprising disconnecting (216) one or more of the fuel tanks (102) from the refueling assembly (100).

E6. The method (200) of any of paragraphs E-E5, further comprising operatively coupling (218) the fuel-source valve assembly (112) to a fuel-receiving device (116).

INDUSTRIAL APPLICABILITY

The refueling assemblies, fuel tanks, and methods disclosed herein are applicable to the outdoor appliances and portable fuel tank industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A hand-transportable portable refueling assembly (100), comprising:

a chassis (104) comprising a body (106) defining a plurality of docking ports (108) configured to operatively and respectively receive a plurality of fuel tanks (102); wherein the chassis (104) further comprises a handle (105) configured to be held by a user to carry the refueling assembly (100), and a stand (107) configured to maintain the chassis (104) in an upright position;

at least one fuel conduit (110) supported by and/or defined by the body (106);

a plurality of docking-port valve assemblies (130) supported by the body (106), in fluid communication with the at least one fuel conduit (110), and configured to be operatively coupled to the plurality of fuel tanks (102) when the plurality of fuel tanks (102) are operatively positioned in the plurality of docking ports (108); and a fuel-source valve assembly (112) supported by the body (106), in fluid communication with the at least one fuel conduit (110), and configured to be operatively coupled to a fuel source (114) to selectively permit fuel from the fuel source (114) to be operatively delivered to the plurality of fuel tanks (102) when the plurality of fuel tanks (102) are operatively coupled to the plurality of docking-port valve assemblies (130).

2. The refueling assembly (100) of claim 1, wherein the at least one fuel conduit (110) comprises a plurality of fuel conduits (110) fluidically coupling the fuel-source valve assembly (112) to the plurality of docking-port valve assemblies (130).

3. The refueling assembly (100) of claim 1, wherein each docking-port valve assembly (130) of the plurality of docking-port valve assemblies (130) comprises a docking-port connector (144) that is configured to be operatively coupled to a fuel tank connector (146) of a respective fuel tank (102) of the plurality of fuel tanks (102) when operatively positioned in a respective docking port (108) of the plurality of docking ports (108) to fluidically couple the respective docking-port valve assembly (130) to the respective fuel tank (102).

4. The refueling assembly (100) of claim 3, wherein the docking-port connector (144) comprises a docking-port threaded member (150).

5. The refueling assembly (100) of claim 4, wherein the docking-port threaded member (150) comprises a docking-port female threaded member (152).

6. The refueling assembly (100) of claim 3, wherein the docking-port connector (144) comprises a docking-port bayonet connector (154), and further wherein the docking-port bayonet connector (154) comprises a female receiving area (174) and a bayonet slot (170), wherein the bayonet slot (170) is configured to receive a bayonet post (172) of the respective fuel tank (102) to operatively secure the respective fuel tank (102) to the respective docking-port valve assembly (130).

7. The refueling assembly (100) of claim 1, further comprising a plurality of adapters (148), wherein each adapter (148) of the plurality of adapters (148) is configured to be operatively coupled to a respective fuel tank (102) of the plurality of fuel tanks (102) and to a respective docking-port valve assembly (130) of the plurality of docking-port valve assemblies (130) to operatively permit the fuel to pass from the respective docking-port valve assembly (130) through the respective adapter (148) and into the respective fuel tank (102).

8. The refueling assembly (100) of claim 7, wherein each adapter (148) of the plurality of adapters (148) comprises:

an adapter port connector (149), wherein each docking-port valve assembly (130) of the plurality of docking-port valve assemblies (130) comprises a docking-port connector (144) that is configured to be operatively coupled to the adapter port connector (149); and an adapter tank connector (151) configured to be operatively coupled to the respective fuel tank (102).

9. The refueling assembly (100) of claim 7, wherein each adapter (148) of the plurality of adapters (148) is at least one of fixedly secured to and integrally formed with the respective fuel tank (102) of the plurality of fuel tanks (102).

10. The refueling assembly (100) of claim 7, wherein each fuel tank (102) of the plurality of fuel tanks (102) includes a fuel-tank male threaded member (162) configured to be operatively coupled to a fuel-receiving device (116) to deliver the fuel from the respective fuel tank (102) to the fuel-receiving device (116), and wherein a docking-port connector (144) of each docking-port valve assembly (130) of the plurality of docking-port valve assemblies (130) is not configured to be operatively coupled to the fuel-tank male threaded member (162).

11. The refueling assembly (100) of claim 1, wherein the fuel-source valve assembly (112) comprises:

a fuel-source connector (118) configured to be operatively coupled to the fuel source (114) to receive the fuel from the fuel source (114) into the at least one fuel conduit (110);

a main valve (120) configured to be selectively opened and closed, wherein, when the main valve (120) is open, the main valve (120) is configured to permit the fuel to pass through the fuel-source valve assembly (112) into the at least one fuel conduit (110), and when the main valve (120) is closed, the main valve (120) is configured to prevent the fuel from passing from the fuel source (114) through the fuel-source valve assembly (112) into the at least one fuel conduit (110) and to the plurality of fuel tanks (102); and a main-valve actuator (122) configured to be actuated to selectively open and close the main valve (120).

12. The refueling assembly (100) of claim 11, wherein the fuel-source valve assembly (112) comprises an Overfill Protection Device (OPD) valve (128).

13. The refueling assembly (100) of claim 1, wherein each docking-port valve assembly (130) of the plurality of docking-port valve assemblies (130) comprises a docking-port valve (132) that is configured to be selectively opened and closed, wherein, when the docking-port valve (132) is open, the docking-port valve (132) is configured to permit the fuel to pass between the at least one fuel conduit (110) and a respective fuel tank (102) of the plurality of fuel tanks (102) through a respective docking-port valve assembly (130), and when the docking-port valve (132) is closed, the docking-port valve (132) is configured to prevent the fuel from passing between the at least one fuel conduit (110) and the respective fuel tank (102) through the respective docking-port valve assembly (130).

14. The refueling assembly (100) of claim 13, wherein the docking-port valve assembly (130) further comprises a docking-port valve actuator (134), wherein the docking-port valve actuator (134) is configured to be actuated by a user to selectively open and close the docking-port valve (132).

15. The refueling assembly (100) of claim 13, wherein the docking-port valve (132) is configured to automatically open in response to engagement with the respective fuel tank (102) when the respective fuel tank (102) is operatively coupled to the respective docking-port valve assembly (130); and wherein the docking-port valve (132) is configured to automatically close in response to disengagement from the respective fuel tank (102) when the respective fuel tank (102) is disconnected from the respective docking-port valve assembly (130).

16. The refueling assembly (100) of claim 1, further comprising the plurality of fuel tanks (102), wherein each fuel tank (102) of the plurality of fuel tanks (102) comprises:

a fuel-tank chamber (103) configured to receive and store fuel from the fuel source (114);

a fuel-tank male threaded member (162) configured to be operatively coupled to a fuel-receiving device (116) to permit the fuel to pass from the fuel-tank chamber (103) to the fuel-receiving device (116); and a fuel tank connector (146) configured to be operatively coupled directly to a docking-port connector (144) of a docking-port valve assembly (130) of the plurality of docking-port valve assemblies (130) of the refueling assembly (100) to permit fuel from the fuel source (114) to be received into the fuel-tank chamber (103) via the refueling assembly (100), wherein the fuel tank connector (146) is distinct from the fuel-tank male threaded member (162).

17. A method (200) of simultaneously refilling a plurality of fuel tanks (102) that each include a fuel-tank chamber (103) configured to receive and store a fuel utilizing the refueling assembly (100) of claim 1, the method (200) comprising:

operatively coupling (202) each fuel tank (102) of the plurality of fuel tanks (102) to refueling assembly (100);

operatively coupling (204) fuel-source valve assembly (112) of the refueling assembly (100) to a fuel source (114);

opening (208) a main valve (120) of the fuel-source valve assembly (112) to permit fuel from the fuel source (114) to flow through the at least one fuel conduit (110) to each fuel tank (102) of the plurality of fuel tanks (102); and simultaneously flowing fuel from the fuel source (114) through the fuel-source valve assembly (112) to the fuel-tank chambers (103) of the plurality of fuel tanks (102).

18. The refueling assembly (100) of claim 16, wherein each of the fuel-tank male threaded member (162) and the fuel tank connector (146) is an integral component of the fuel tank (102).

19. The refueling assembly (100) of claim 16, wherein the fuel tank connector (146) extends around a base (168) of the fuel-tank male threaded member (162).

20. The refueling assembly (100) of claim 16, wherein the fuel tank connector (146) is one of a fuel-tank bayonet connector (166) and a male threaded collar (164).

21. The refueling assembly (100) of claim 16, wherein the fuel-tank male threaded member (162) is not configured to be operatively coupled directly to the docking-port valve assembly (130) of the plurality of docking-port valve assemblies (130).

22. The refueling assembly (100) of claim 16, wherein the fuel tank connector (146) is not configured to be operatively coupled directly to the fuel-receiving device (116) to which the fuel-tank male threaded member (162) is configured to be directly operatively coupled.

23. The refueling assembly (100) of claim 16, wherein each fuel tank (102) of the plurality of fuel tanks (102) includes the fuel-tank chamber (103) that is configured to receive and store at least 8 ounces and at most 24 ounces of fuel.

* * * * *